US010737578B2

(12) United States Patent
Thieme et al.

(10) Patent No.: US 10,737,578 B2
(45) Date of Patent: *Aug. 11, 2020

(54) SEMI-ACTIVE PARTIAL PARALLEL BATTERY ARCHITECTURE FOR AN AUTOMOTIVE VEHICLE SYSTEMS AND METHODS

(71) Applicant: CPS Technology Holdings LLC, New York, NY (US)

(72) Inventors: Bryan L. Thieme, Colgate, WI (US); Daniel B. Le, Grafton, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,969

(22) Filed: May 14, 2018

(65) Prior Publication Data

US 2018/0257506 A1   Sep. 13, 2018

Related U.S. Application Data

(63) Continuation of application No. 14/938,664, filed on Nov. 11, 2015, now Pat. No. 9,969,292.

(Continued)

(51) Int. Cl.
*B60L 1/00* (2006.01)
*B60L 11/18* (2006.01)
(Continued)

(52) U.S. Cl.
CPC .......... *B60L 11/1861* (2013.01); *B60L 1/00* (2013.01); *B60L 1/003* (2013.01); *B60L 7/14* (2013.01);
(Continued)

(58) Field of Classification Search
CPC .... B60L 1/00; B60L 7/10; B60L 11/02; B60L 11/1861; B60L 11/1862; B60L 11/1868;
(Continued)

(56) References Cited

U.S. PATENT DOCUMENTS 5,194,799 A   3/1993   Tomantschger
6,229,279 B1   5/2001   Dierker
(Continued)

FOREIGN PATENT DOCUMENTS

CN   201824862   5/2011
DE   102011000490 A1   3/2012
(Continued)

OTHER PUBLICATIONS

PCT/US2015/060407 International Search Report and Written Opinion dated Feb. 11, 2016.
CN 201580056660.4 Office Action dated Feb. 31, 2019.

*Primary Examiner* — William Hernandez
(74) *Attorney, Agent, or Firm* — Boardman & Clark LLP

(57) ABSTRACT

An automotive battery system that includes a lead-acid battery electrically coupled to a first bus, in which the lead-acid battery supplies electrical power to a starter via the first bus to cold crank an internal combustion engine of a vehicle; a lithium-ion battery electrically coupled to a second bus, in which the lithium-ion battery captures and stores electrical energy generated by a regenerative braking system when the vehicle brakes and supplies electrical power to the second bus using the electrical energy captured from the regenerative braking system such that a first portion of the second electrical power is supplied to an electrical system; and a DC/DC converter electrically coupled between the first bus and the second bus, in which the DC/DC converter controls supply of a second portion of the second electrical power to charge the lead-acid battery.

16 Claims, 8 Drawing Sheets

Related U.S. Application Data

(60) Provisional application No. 62/079,848, filed on Nov. 14, 2014.

(51) Int. Cl.

| | | |
|---|---|---|
| *H01M 10/44* | (2006.01) | |
| *H01M 16/00* | (2006.01) | |
| *B60L 7/14* | (2006.01) | |
| *B60W 10/06* | (2006.01) | |
| *B60W 10/26* | (2006.01) | |
| *B60W 20/13* | (2016.01) | |
| *B60W 20/14* | (2016.01) | |
| *B60L 58/20* | (2019.01) | |
| *B60L 50/60* | (2019.01) | |
| *B60L 58/13* | (2019.01) | |
| *B60L 50/10* | (2019.01) | |
| *B60L 58/12* | (2019.01) | |
| *B60R 16/03* | (2006.01) | |
| *F02N 11/08* | (2006.01) | |
| *H01M 10/0525* | (2010.01) | |
| *H01M 10/06* | (2006.01) | |
| *B60R 16/033* | (2006.01) | |

(52) U.S. Cl.
CPC ............ *B60L 50/10* (2019.02); *B60L 50/66* (2019.02); *B60L 58/12* (2019.02); *B60L 58/13* (2019.02); *B60L 58/20* (2019.02); *B60R 16/03* (2013.01); *B60W 10/06* (2013.01); *B60W 10/26* (2013.01); *B60W 20/13* (2016.01); *B60W 20/14* (2016.01); *F02N 11/0866* (2013.01); *H01M 10/441* (2013.01); *H01M 16/00* (2013.01); *B60L 2210/10* (2013.01); *B60L 2260/26* (2013.01); *B60R 16/033* (2013.01); *H01M 10/0525* (2013.01); *H01M 10/06* (2013.01); *H01M 2220/20* (2013.01); *Y02E 60/122* (2013.01); *Y02E 60/126* (2013.01); *Y02T 10/70* (2013.01); *Y02T 10/7011* (2013.01); *Y02T 10/7016* (2013.01); *Y02T 10/7044* (2013.01); *Y02T 10/7066* (2013.01); *Y02T 10/7077* (2013.01); *Y02T 10/7216* (2013.01)

(58) Field of Classification Search
CPC .... B60L 11/1877; B60R 16/03; B60W 10/06; B60W 10/24; B60W 10/26; F02N 11/0866; H01M 10/441; H01M 16/00

USPC .............................................. 307/10.1, 10.6
See application file for complete search history.

(56) References Cited

U.S. PATENT DOCUMENTS

| | | | |
|---|---|---|---|
| 6,275,001 B1 | 8/2001 | Dierker | |
| 6,331,365 B1 | 12/2001 | King | |
| 7,042,115 B2 * | 5/2006 | Mizutani | F02N 11/0814 307/10.1 |
| 7,049,792 B2 | 5/2006 | King | |
| 7,336,002 B2 | 2/2008 | Kato et al. | |
| 7,869,913 B2 | 1/2011 | Aoyama | |
| 8,022,663 B2 | 9/2011 | Davis et al. | |
| 8,093,862 B2 | 1/2012 | Mariels | |
| 8,288,995 B2 | 10/2012 | Jimbo et al. | |
| RE43,956 E | 2/2013 | King et al. | |
| 8,381,852 B2 | 2/2013 | Zolman et al. | |
| 8,384,343 B2 | 2/2013 | Kojori et al. | |
| 8,392,030 B2 | 5/2013 | Anderson et al. | |
| 8,471,521 B2 | 6/2013 | Stewart et al. | |
| 8,534,400 B2 | 9/2013 | Stanek et al. | |
| 9,071,081 B2 * | 6/2015 | Iwami | H01M 10/482 |
| 2003/0160510 A1 | 8/2003 | Mizutani et al. | |
| 2006/0097577 A1 * | 5/2006 | Kato | F02N 11/0866 307/10.1 |
| 2007/0032915 A1 | 2/2007 | Yamaguchi | |
| 2008/0113226 A1 | 5/2008 | Dasgupta et al. | |
| 2012/0112688 A1 | 5/2012 | Ho | |
| 2012/0235642 A1 | 9/2012 | Mao et al. | |
| 2013/0082639 A1 | 4/2013 | O'Kane et al. | |
| 2013/0116689 A1 | 5/2013 | Zhang et al. | |
| 2013/0116889 A1 * | 5/2013 | Zhang | H02J 1/08 701/36 |
| 2013/0141045 A1 | 6/2013 | Karim et al. | |
| 2013/0264875 A1 | 10/2013 | Kaminsky et al. | |
| 2014/0067183 A1 * | 3/2014 | Sisk | B60L 50/66 701/22 |
| 2014/0184153 A1 | 7/2014 | Saint-Leger et al. | |
| 2014/0200763 A1 | 7/2014 | Sisk | |
| 2015/0202983 A1 | 7/2015 | Le et al. | |

FOREIGN PATENT DOCUMENTS

| | | |
|---|---|---|
| WO | 2003088375 A3 | 3/2004 |
| WO | 2010091583 A1 | 9/2010 |
| WO | 2012048478 A1 | 4/2012 |
| WO | 2012125954 A2 | 9/2012 |
| WO | 2012160292 A2 | 11/2012 |

* cited by examiner

SEMI-ACTIVE PARTIAL PARALLEL BATTERY ARCHITECTURE FOR AN AUTOMOTIVE VEHICLE SYSTEMS AND METHODS

CROSS REFERENCE TO RELATED APPLICATIONS

Under 35 U.S.C. § 120, this application is a continuation of U.S. patent application Ser. No. 14/938,664 filed Nov. 11, 2015, which claims priority from and benefit of U.S. Provisional Application Ser. No. 62/079,848 filed Nov. 14, 2014, both of which are incorporated by reference herein in their entireties for all purposes.

BACKGROUND

The present disclosure relates generally to the field of battery systems and, more particularly, to battery systems that may be used in an automotive vehicle context.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems.

The term HEV may include any variation of a hybrid electric vehicle. For example, full hybrid electric vehicles (FHEVs) may provide motive and other electrical power to the vehicle using one or more electric motors, using only an internal combustion engine, or using both. In contrast, mild hybrid electric vehicles (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator.

Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs. Further, dual battery xEV technology has led to reductions in undesirable emissions compared to more traditional gas-powered vehicles. For example, regenerative braking vehicles capture and store electrical energy generated when the vehicle is braking or coasting. The captured electrical energy may then be utilized to supply power to the vehicle's electrical system. As another example, battery modules in accordance with present embodiments may be incorporated with or provide power to stationary power systems (e.g., non-automotive systems).

As technology continues to evolve, there is a need to provide improved power sources, particularly battery modules, for such vehicles. Based on the advantages over traditional gas-power vehicles, manufactures may desire to utilize improved vehicle technologies (e.g., regenerative braking systems) within their vehicle lines. To implement the improved vehicle technologies, the manufacturer may find it desirable to adjust configuration of their traditional vehicle platforms. For example, it is now recognized that, to improve advantages provided by a regenerative braking system, a manufacturer may wish to adjust configuration of a battery system to improve efficiency with which the battery system supplies and/or captures electrical energy generated during regenerative braking.

SUMMARY

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

A first embodiment describes an automotive battery system that includes a lead-acid battery electrically coupled to a first bus, in which the lead-acid battery supplies electrical power to a starter via the first bus to cold crank an internal combustion engine of a vehicle; a lithium-ion battery electrically coupled to a second bus, in which the lithium-ion battery captures and stores electrical energy generated by a regenerative braking system when the vehicle brakes and supplies electrical power to the second bus using the electrical energy captured from the regenerative braking system such that a first portion of the second electrical power is supplied to an electrical system; and a DC/DC converter electrically coupled between the first bus and the second bus, in which the DC/DC converter controls supply of a second portion of the second electrical power to charge the lead-acid battery.

A second embodiment describe a method for operating a battery system including cold cranking, using a starter, an internal combustion engine when a vehicle is transitioned from key off to key on, in which a first battery of the battery system supplies first electrical power to the starter to cold crank the internal combustion engine; converting, using a regenerative braking system, mechanical energy from motion of the vehicle into electrical energy; capturing, using a second battery of the battery system, the electrical energy generated by the regenerative braking system; outputting a second electrical power from the second battery using the electrical energy generated by the regenerative braking system; and controlling, using a DC/DC converter, supply of a first portion of the second electrical power to an electrical system of the vehicle and supply of a second portion of the second electrical power to the first battery.

A third embodiment describes a tangible, non-transitory, computer-readable medium that stores instructions executable by a processor in a vehicle. The instructions include instruction to instruct, using the processor, a battery system of the vehicle to disconnect a first battery from a starter of the vehicle to enable a second battery to supply first electrical power to the starter by itself to cold crank an internal combustion engine when the vehicle transitions from key off to key on; determine, using the processor, whether state of charge of the first battery is greater than a first threshold; instruct, using the processor, an alternator of the vehicle to convert first mechanical energy from the internal combustion engine into first electrical energy when the state of charge of the first battery is not greater than the first threshold such that at least a portion of second electrical power output by the alternator is used to charge the first battery above the first threshold; and instruct, using the processor, the battery system to control division of third electrical power output from the first battery between a first portion used to charge the second battery and a second portion used to power an electrical system of the vehicle when the state of charge of the first battery is greater than the first threshold.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
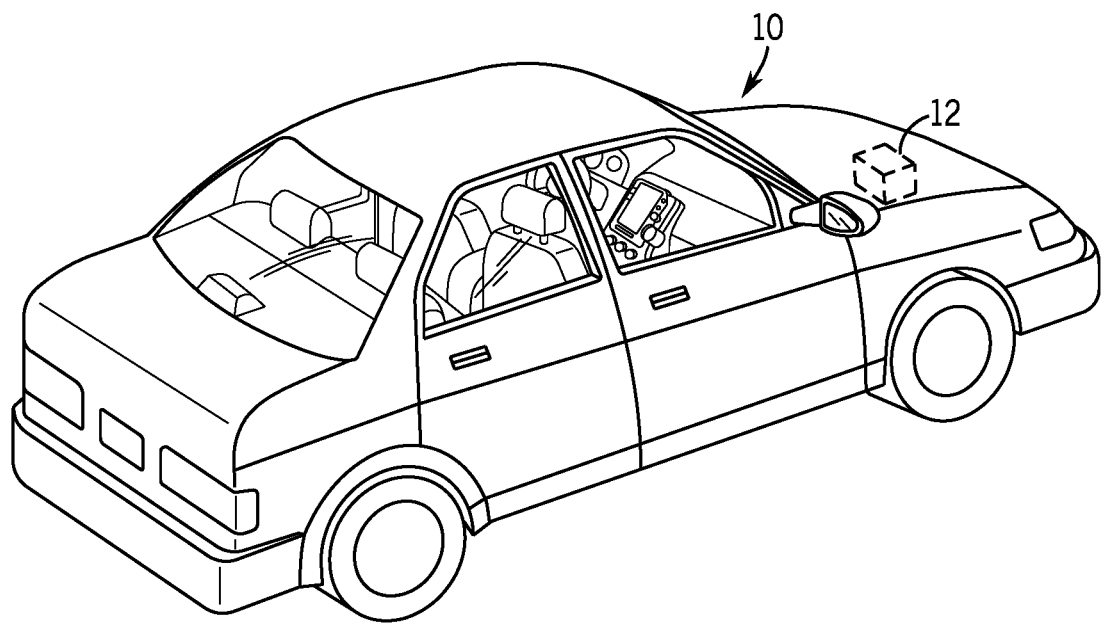
FIG. 1 is a perspective view of a vehicle (an xEV) having a battery system contributing all or a portion of the power for the vehicle, in accordance with an embodiment of the present approach.

One or more specific embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, vehicle technology has improved to increase fuel economy and/or reduce undesirable emissions compared to traditional gas-powered vehicles. For example, a vehicle may include a regenerative braking system to convert mechanical energy of the vehicle into electrical energy while the vehicle brakes. A battery system may capture the electrical energy for subsequent supply to electrical components of the vehicle, such as the air conditioner and/or the radio.

In traditional gas-power vehicles, an internal combustion engine may drive an alternator to generate electrical energy used to power electrical components of the vehicle. The regenerative braking system may enable the alternator to be disabled for longer periods of time, thereby reducing load on the internal combustion engine. As such, the internal combustion engine may burn less fuel and, thus, reduce undesired emissions and/or increase fuel economy of the vehicle.

Based on the advantages over traditional gas-power vehicles, manufactures may desire to utilize improved vehicle technologies (e.g., regenerative braking technology) within their vehicle lines. These manufactures often utilize one of their traditional vehicle platforms as a starting point. Generally, traditional gas-powered vehicles are designed to utilize battery systems that include a single twelve volt lead-acid (PbA) battery. It may be possible to utilize traditional battery systems with improved vehicle technologies, such as a regenerative braking system. For example, a lead-acid battery may capture and store electrical energy generated during regenerative braking for subsequent supply to electrical components of the vehicle.

However, using the lead-acid battery to capture electrical energy generated during regenerative braking may limit operational efficiency of the battery system. More specifically, compared to other battery chemistries, a lead-acid battery may have a lower coulombic efficiency and/or a lower charge acceptance rate limit. As used herein, "coulombic efficiency" and "charge acceptance rate limit" may be used interchangeably to describe efficiency with which a battery captures and stores electrical energy. In other words, a lead-acid battery may be capable of capturing and storing less electrical energy at one time compared to, for example, a lithium-ion (Li-ion) battery. As such, using a single lead-acid battery may limit an amount of electrical energy captured during regenerative braking and, thus, limit advantages provided by the regenerative braking system.

Accordingly, as will be described in more detail below, embodiments of the present disclosure provide techniques to improve operational efficiency of a battery system by including multiple batteries with differing battery configurations. As used herein, "battery" is intended describe an energy storage device that utilize a chemical reaction to store and/or distribute electrical power. Additionally, as used herein "battery configuration" is intended to describe properties of the battery, such as output voltage and/or battery chemistry. Thus, in some embodiments, the battery system may include a first battery that is electrically connected to twelve voltage electrical components and a second battery that is electrically connected to forty-eight voltage electrical components. Additionally, in some embodiments, the battery system may include a first battery with a lead-acid battery chemistry and a second battery with a lithium-ion battery chemistry.

Utilizing multiple batteries with differing battery chemistries may facilitate utilizing strengths of the different battery chemistries. For example, since less affected by cold temperatures and deep discharging, the battery system may use the lead-acid battery to cold crank the internal combustion engine. As used herein, "cold crank" is intended to describe starting the internal combustion engine when transitioning from key off to key on. Additionally, since having a higher coulombic efficiency and/or a higher charge acceptance rate limit, the battery system may use the lithium-ion battery to capture and store electrical energy generated during regenerative braking. In other words, the battery system may divide operations between the multiple batteries based at least in part on their respective strengths.

Various architectures (e.g., configurations) may be used for a battery system. However, some may be better suited for dividing operations between multiple batteries, for example, by simplifying control scheme and/or increasing amount of control over operation of the battery system. One architecture may be semi-active partial parallel battery architecture. In this architecture, a first battery (e.g., a lead-acid battery) may be electrically connected in parallel with a starter used to crank the internal combustion engine via a first bus. Additionally, a second battery (e.g., a lithium-ion battery) may be connected in parallel with an electrical system (e.g., electrical components of the vehicle) and a regenerative braking system via a second bus. Additionally, a DC/DC converter may be electrically coupled between the first bus and the second bus.

In this manner, the battery system may use the DC/DC converter to control electrical power flowing between the first bus and the second bus. For example, the DC/DC converter may disconnect the first bus and the second bus during a cold cranking to enable the first battery to supply electrical power to the starter by itself. Additionally, the DC/DC converter may disconnect the first bus and the second bus during regenerative braking to enable the second battery to capture the generated electrical energy by itself. Furthermore, the DC/DC converter may control magnitude of current flowing from the second bus to the first bus to control charging rate of the first battery, for example, based on its charge acceptance rate limit and/or power consumption by the electrical system.

As such, the semi-active partial parallel architecture may facilitate dividing operations between the first battery and the second battery, for example, based on their respective strengths, to improve operational efficiency of the battery system. In fact, in some embodiments, the battery system may use a battery to only perform operations it is best suited for. For example, the battery system may use a first battery (e.g., lead-acid battery) only to crank the internal combustion engine, but not to capture electrical energy generated during regenerative braking or to supply electrical power to the electrical system. In such an embodiment, storage capacity and, thus, physical size of the first battery may be reduced, which may facilitate reducing overall size of the battery system. Additionally, the battery system may use the second battery (e.g., lithium-ion battery) to gradually charge the first battery while also supplying electrical power to the electrical system. In such embodiments, current capacity of the DC/DC converter may be reduced, which may facilitate reducing overall size and/or cost of the battery system.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

It is now recognized that it is desirable for a non-traditional battery system 12 (e.g., a lithium ion car battery) to be largely compatible with traditional vehicle designs. In this respect, present embodiments include various types of battery modules for xEVs and systems that include xEVs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
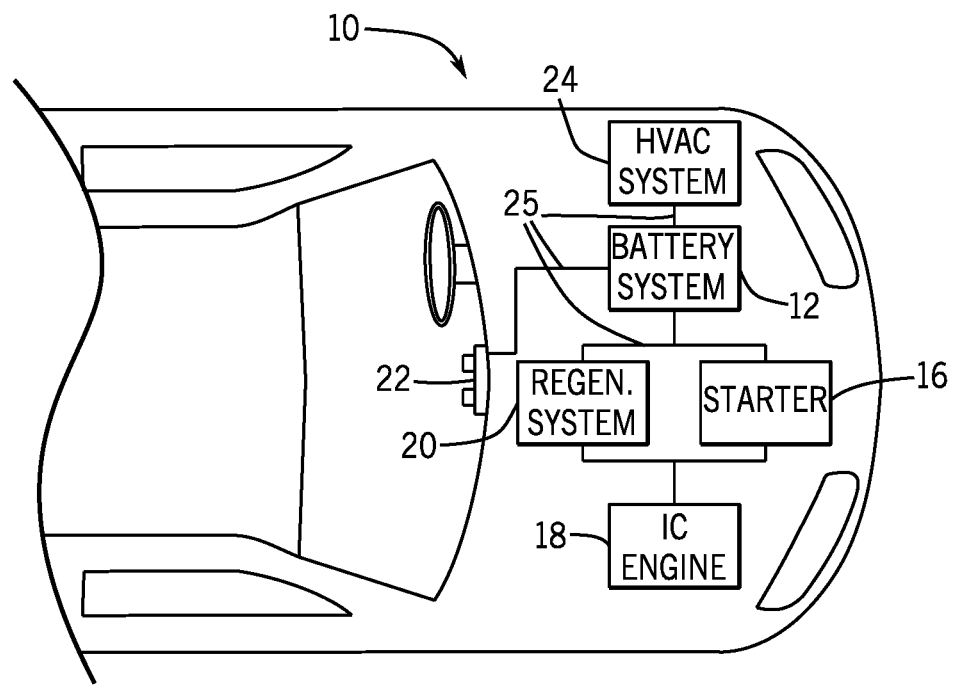
FIG. 2 is a cutaway schematic view of the xEV of FIG. 1 in the form of a hybrid electric vehicle (HEV), in accordance with an embodiment of the present approach.

To simplify discussion, the battery system 12 will be discussed as being disposed under the hood of the vehicle 10, as depicted in FIG. 2. As described above, the battery system 12 may be electrically connected to electrical components in the vehicle 10. For illustrative purposes, the electrical components in the depicted embodiment include a starter 16, a regenerative braking system 20, a vehicle console 22, and a heating, ventilation, and air conditioning (HVAC) system 24.

In this manner, the battery system 12 may supply electrical power to one or more electrical components in the vehicle 10 via one or more busses 25. For example, the battery system 12 may supply electrical power to the starter 16 to crank (e.g., start) an internal combustion engine 18. In some embodiments, the starter 16 may use the electrical power to generate a spark that starts combustion in the internal combustion engine 18.

Additionally, the battery system 12 supply electrical power to other electrical components, such as the vehicle console 22 and the HVAC system 24. As used herein, the other electrical components are collectively referred to as the "electrical system." Thus, the electrical system may include a radiator cooling fan, a climate control system, an electric power steering system, an active suspension system, an auto park system, an electric oil pump, an electric supercharger/turbocharger, an electric water pump, a heated windscreen/defroster, a window lift motor, a vanity light, a tire pressure monitoring system, a sunroof motor control, a power seat, an alarm system, an infotainment system, a navigation feature, a lane departure warning system, an electric parking brake, an external light, or any combination thereof.

Additionally, the battery system 12 may receive electrical power from one or more electrical components in the vehicle 10. For example, the battery system 12 may receive electrical power output from the regenerative braking system 20 when the vehicle 10 is braking. As described above, the regenerative braking system 20 may output electrical power by converting mechanical energy of the vehicle 10 into electrical energy. More specifically, the vehicle 10 may have mechanical (e.g., kinetic) energy due to its motion. When braking, the vehicle reduces its motion and, thus, its mechanical energy. This reduction in mechanical energy may be dissipated as heat, for example, produced by traditional brake pads.

Additionally or alternatively, the regenerative braking system 20 may convert at least a portion of this reduction in mechanical energy into electrical energy using a generator, such as the alternator, a belt starter generator (BSG), an electric motor, or the like. In some embodiments, the motion of the vehicle 10 may be used to actuate the generator, thereby consuming mechanical energy of the vehicle 10 and generating electrical energy. For example, the regenerative braking system 20 may mechanically connect the alternator to the wheels of the vehicle 10 so that rotation of the wheels may actuate the alternator, thereby reducing speed of the vehicle and outputting electrical power.

As described above, the battery system 12 may utilize multiple batteries with varying battery configurations to improve operational efficiency. To help illustrate, a more detailed view of an embodiment of the battery system 12 and a control unit 32 used to control operation of the battery system 12 are described in FIG. 3. In the depicted embodiment, the battery system 12 includes a first battery 26, a second battery 28, one or more sensors 29, and one or more controllable switching devices 30. Although described with regard to two batteries, other embodiments may include two or more batteries with varying battery configurations (e.g., output voltage and/or battery chemistry). For example, in other embodiments, the battery system 12 may include three batteries each with a different battery chemistry and/or a different output voltage.

As described above, the battery system 12 may be electrically connected to various electrical components in the vehicle 10. Generally, electrical components are designed to operate with specific electrical power (e.g., specific voltage). Thus, in some embodiments, electrical components in the vehicle 10 may be desired to operate with different voltages. For example, a first component may be designed or configured to operate with twelve volt electrical power while a second component may be designed or configured to operate with forty-eight volt electrical power.

Thus, utilizing multiple batteries with varying battery configurations may facilitate electrically connecting the battery system 12 with electrical components designed to operate at different voltages. Generally, electrical power output by a battery may depend at least in part on configuration of its battery cells 34. For example, connecting battery cells 34 in series may enable increasing voltage of the battery and connecting battery cells 34 in parallel may enable increase current of the battery. Thus, continuing with the above example, battery cells 34 of the first battery 26 may be configured so that the first battery 26 is a twelve voltage battery and battery cells 34 of the second battery 28 may be configured so that the second battery is a forty-eight volt battery. As such, the battery system 12 may use the first battery 26 to electrically connect with the first component and the second battery 28 to electrically connect with the second component.

Additionally, the battery system 12 may include multiple batteries with varying battery chemistries to utilize the strengths of the different battery chemistries. Generally, different battery chemistries may have different operational characteristics, such as open-circuit voltage, charge acceptance rate limit, coulombic efficiency, designed operating temperature range, and the like.

Figure 4:
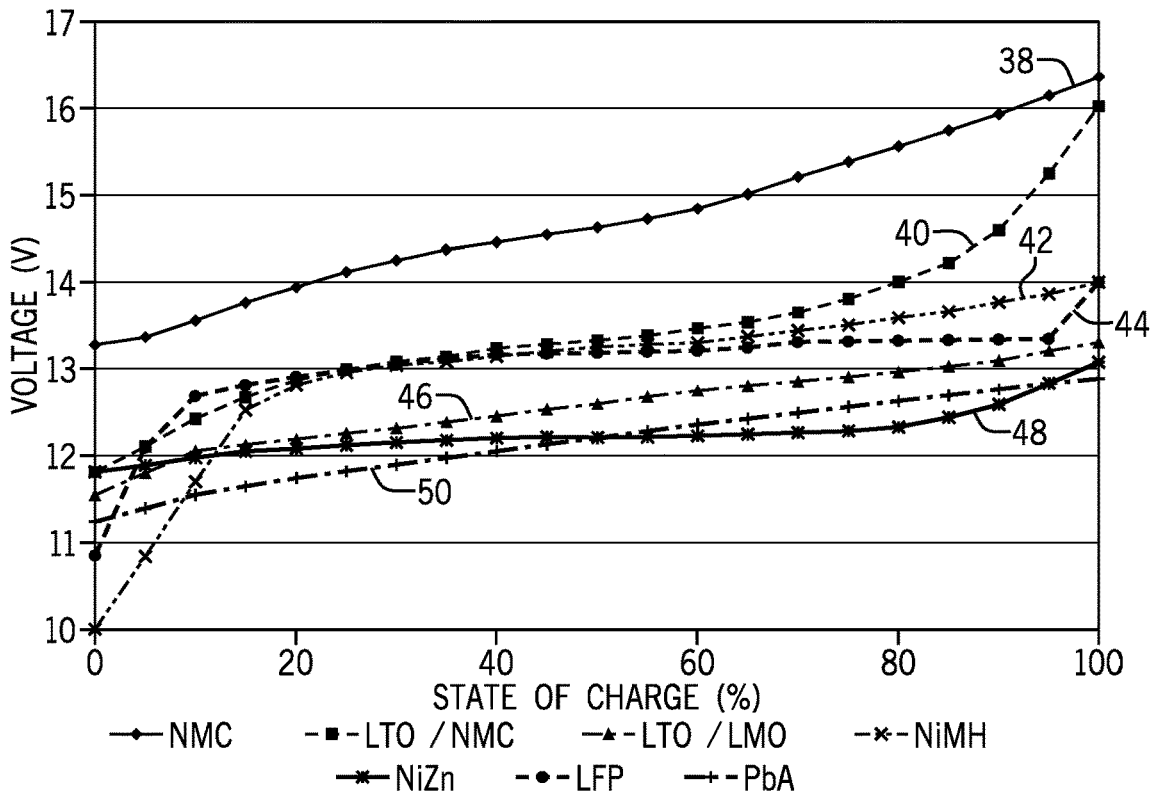
FIG. 4 is a graph illustrating voltage characteristics o various battery chemistries, in accordance with an embodiment.

To help illustrate, characteristics of multiple twelve volt batteries with different battery chemistries are described with respect to FIG. 4. Specifically, the batteries include a lithium nickel manganese cobalt oxide (NMC) battery, a lithium-titanate/lithium nickel manganese cobalt oxide (NMC/LTO) battery, a lithium-titanate/lithium manganese oxide (LMO/LTO) battery, a nickel-metal hydride (NiMH) battery, a nickel-zinc (NiZn) battery, a lithium iron phosphate (LFP) battery, and a lead-acid (PbA) battery are described. In some embodiments, an NMC battery cell may include a lithium nickel manganese cobalt oxide cathode with a graphite anode, a NMC/LTO battery cell may include a lithium manganese oxide cathode with a lithium-titanate anode, an LMO/LTO battery cell may include a lithium manganese oxide cathode and a lithium-titanate anode, and an LFP battery cell may include a lithium iron phosphate cathode and a graphite anode.

As depicted, FIG. 4 is an XY plot that describes the voltage characteristics of each of the batteries over its total state of charge (e.g., from 0% state of charge to 100% state of charge), in which state of charge is shown on the X-axis and voltage is shown on the Y-axis. As such, the depicted embodiment includes an NMC voltage curve 38 that describes voltage characteristics of the NMC battery, a NMC/LTO voltage curve 40 that describes voltage characteristics of the NMC/LTO battery, a NiMH voltage curve 42 that describes voltage characteristics of the NiMH battery, a LFP voltage curve 44 that describes voltage characteristics of the LFP battery, a LMO/LTO voltage curve 46 that describes voltage characteristics of the LMO/LTO battery, a NiZn voltage curve 48 that describes voltage characteristics of the NiZn battery, and a PbA voltage curve 50 that describes voltage characteristics of the lead-acid battery.

As depicted, the batteries may each have different open circuit voltage ranges. Thus, different pairs of battery chemistries selected for the first battery 26 and the second battery 28 may cause the battery system 12 to operate differently. In some embodiments, operation of the battery system 12 may be based at least in part on an amount the open circuit voltage ranges of the first battery 26 and the second battery 28 overlap. For example, the chemistry pair selected may cause the first battery 26 and the second battery 28 to be non-voltage matched, partial voltage matched, or voltage matched. As used herein, "non-voltage matched" is intended to describe when the first battery 26 and the second battery 28 open circuit voltage ranges do not overlap, "partial voltage matched" is intended to describe when the first battery 26 and the second battery 28 open circuit voltage ranges partially overlap (e.g., between 1-74% of the total state of charge of the second battery 28), and "voltage matched" is intended to describe when the first battery 26 and the second battery 28 voltages largely overlap (e.g., between 75-100% of the total state of charge of the second battery 28).

Figure 5:
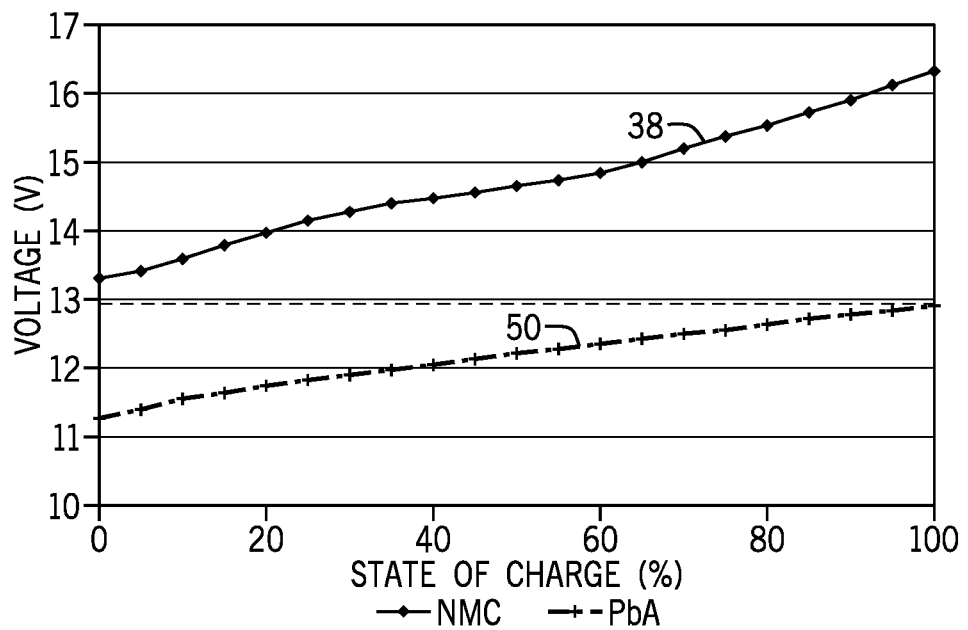
FIG. 5 is a graph illustrating voltage characteristics of non-voltage matched battery chemistries, in accordance with an embodiment.
Figure 6:
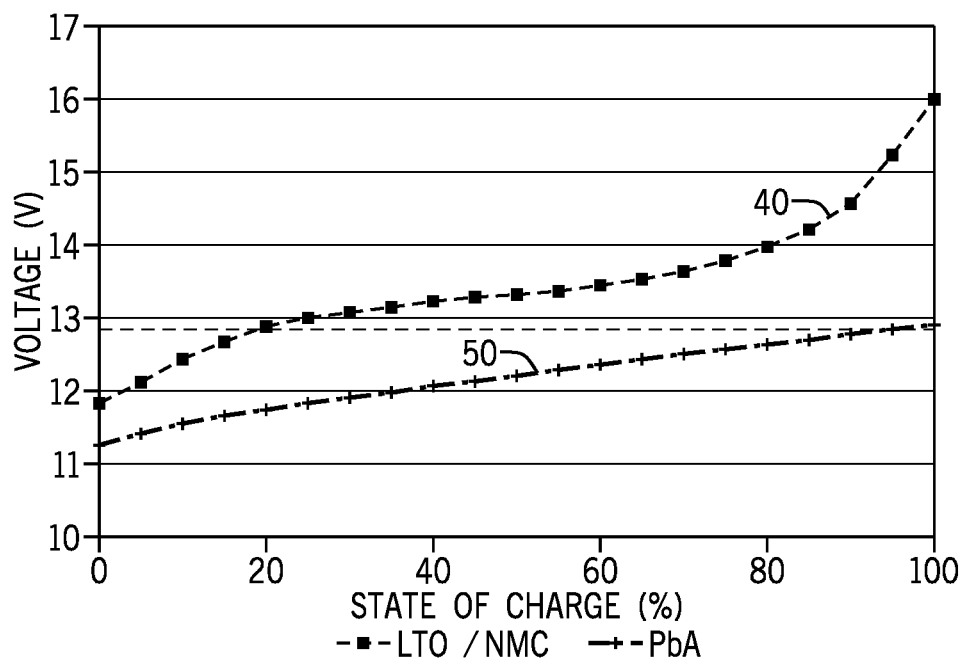
FIG. 6 is a graph illustrating voltage characteristics of partial voltage matched battery chemistries, in accordance with an embodiment.
Figure 7:
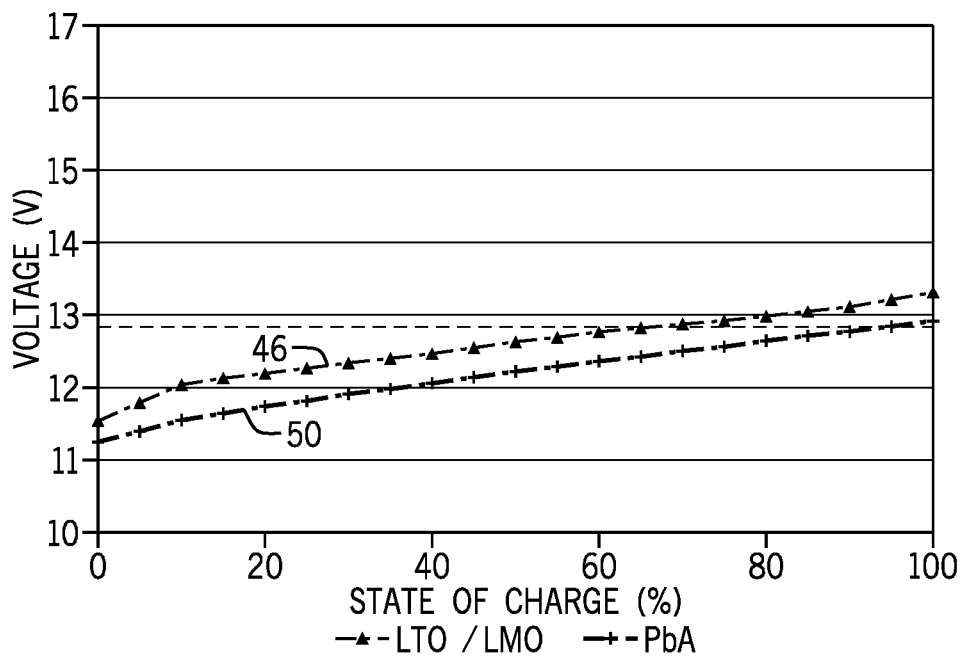
FIG. 7 is a graph illustrating voltage characteristics of voltage matched battery chemistries, in accordance with an embodiment.

To help illustrate, voltage curves for a pair of non-voltage matched batteries are depicted in FIG. 5, voltage curves for a pair of partial voltage matched batteries are depicted in FIG. 6, and voltage curves for a pair of voltage matched batteries are depicted in FIG. 7. For illustrative purposes, in FIGS. 5-7, the first battery 26 will be described as a lead-acid battery and the second battery 28 will be described as different lithium-ion batteries (e.g., a NMC battery, a NMC/LTO battery, and a LMO/LTO battery).

As depicted in FIGS. 4-7, the voltage of each battery may vary with its state of charge (SOC). For example, a lead-acid battery may have an open-circuit voltage of 11.2 volts at 0% state of charge, 12.2 volts at 50% state of charge, and 12.9 volts at 100% state of charge. As such, the lead-acid battery may have an open-circuit voltage range between 11.2-12.9 volts. Although the following discussion is made in reference to a lead-acid battery and a lithium battery, the present techniques may be applied to other battery pairings that have the similar characteristics (e.g., non-voltage matched, partial voltage matched, or non-voltage matched).

As depicted in FIG. 5, when the second battery 28 is a NMC battery, the first battery 26 and the second battery 28 are non-voltage matched because at no point do the PbA voltage curve 50 and the NMC voltage curve 38 overlap. In other words, regardless of their respective state of charge (SOC), the open circuit voltage of the first battery 26 and the second battery 28 voltages do not overlap. To help illustrate, the first battery 26 has an open circuit voltage range of 11.2-12.9 volts and the second battery 28 has an open circuit voltage range between 13.3-16.4 volts. Accordingly, when the second battery 28 is at its lowest voltage (e.g., at 0% state of charge), its voltage is approximately 13.3 volts. On the other hand, when the first battery 26 is at its highest voltage (e.g., 100% state of charge), its voltage is approximately 12.9 volts. In other embodiments, the first battery 26 and the second battery 28 may also be non-voltage matched when the first battery 26 is a lead-acid battery and the second battery 28 is a Lithium Nickel Cobalt Aluminum Oxide (NCA) (e.g., NCA cathode with graphite anode), or a NMC-NCA battery (e.g., blended NMC-NCA cathode with graphite anode).

As depicted in FIG. 6, when the second battery 28 is a NMC/LTO battery, the first battery 26 and the second battery 28 are partial voltage matched because the PbA voltage curve 50 and the NMC/LTO voltage curve 40 partially overlap. As described above, the first battery 26 and the second battery 28 may be partial voltage matched when the voltage overlap corresponds to between 1-74% of total state of charge range of the second battery 28. In other words, depending on their respective states of charge, the open circuit voltage of the first battery 26 and the second battery 28 may be the same.

To help illustrate, the first battery 26 has an open circuit voltage range between 11.2-12.9 volts and the second battery 28 has an open circuit voltage range between 11.8-16 volts. Thus, open-circuit voltages may overlap when the first battery 26 and the second battery 28 are both between 11.8-12.9 volts. As depicted, the second battery 28 has an open circuit voltage of approximately 11.8 volts when at 0% state of charge and 12.9 volts when at 20% state of charge. Thus, the open-circuit voltages may overlap when the second battery 28 is between 0-20% state of charge (e.g., 20% of total state of charge range of the second battery 28). In other embodiments, the first battery 26 and the second battery 28 may also be partial voltage matched when the first battery 26 is a lead-acid battery and the second battery 28 is a NiMH, a LFP battery, or a NMC/LTO-LMO battery (e.g., NMC-LMO cathode with LTO anode).

As depicted in FIG. 7, when the second battery 28 is a LMO/LTO battery, the first battery 26 and the second battery 28 are voltage matched because the PbA voltage curve 50 and the LMO/LTO voltage curve 46 largely overlap. As described above, the first battery 26 and the second battery 28 may be voltage matched when the voltage overlap corresponds to between 75-100% of the second battery's total state of charge range. In other words, the open circuit voltage of the first battery 26 and the open circuit voltage of the second battery 28 may be the same for most of their respective states of charge.

To help illustrate, the first battery 26 has an open circuit voltage range of 11.2-12.9 volts and the second battery 28 has an open circuit voltage range between 11.5-13.3 volts. Thus, open-circuit voltage may overlap when the first battery and the second battery are both between 11.5-12.9 volts. As depicted, the second battery 28 has an open circuit voltage of approximately 11.5 at 0% state of charge and 12.9 at 75% state of charge. Thus, open-circuit voltage may overlap when the second battery is between 75-100% state of charge (e.g., 75% of total state of charge of the second battery 28). In other embodiments, the first battery 26 and the second battery 28 may also be voltage matched when the first battery 26 is a lead-acid battery and the second battery 28 is a NiZn battery.

In addition to voltage ranges, other operational characteristics may be affected by battery chemistry, such as charge acceptance rate limit, coulombic efficiency, designed operating temperature range, and the like. For example, lead-acid batteries may be less affected by deep discharging and be designed to have a larger operating temperature range compared to lithium-ion batteries. On the other hand, lithium ion batteries may have a higher coulombic efficiency and/or a higher charge power acceptance compared to lead-acid batteries.

As such, the battery chemistries used in first battery 26 and the second battery 28 may selected to utilize advantages of multiple different battery chemistries. For example, the first battery 26 may utilize a lead-acid battery chemistry and the second battery 28 may utilize a lithium-ion battery chemistry. To facilitate utilizing advantages, operations performed by the battery system 12 may be divided between the first battery 26 and the second battery 28 based on their respective strengths. For example, the first battery 26 may be utilized to cold crank the internal combustion engine 18 due to its ability to operate at lower temperatures and being less affected by deep discharging. Additionally, the second battery 28 may be utilized to capture and store electrical energy generated during regenerative braking due to its higher coulombic efficiency and/or higher charge power acceptance.

Figure 3:
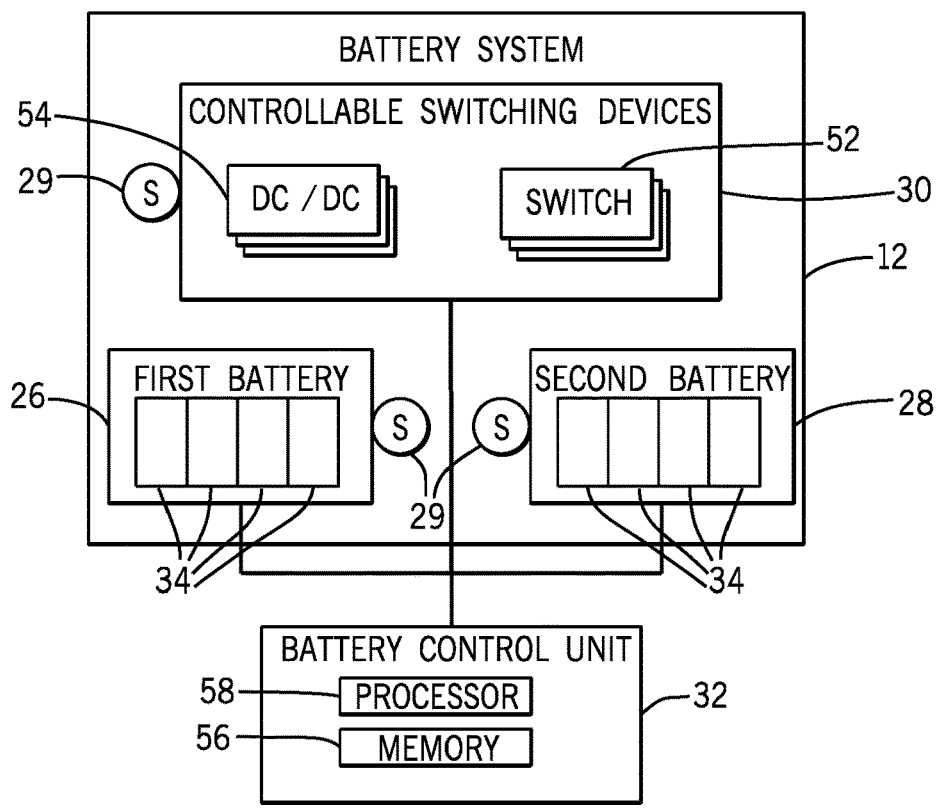
FIG. 3 is a schematic view of the battery system of FIG. 1, in accordance with an embodiment.

In embodiments such as depicted in FIG. 3, the control unit 32 may control operation of the battery system 12 and/or other components of the vehicle 10, such as the regenerative braking system 20, an alternator, the starter 16, the HVAC system 24, and/or the vehicle console 22. In other words, as used herein, the control unit 32 is intended to describe control components of the vehicle 10, which may include a battery control unit, a vehicle control unit, and the like.

In some embodiment, the control unit 32 may control operation of the battery system by instructing a controllable switching device 30 to open or close. In this manner, the battery system 12 may selectively connect and disconnect the first battery 26 and/or the second battery 28 from electrical components in the vehicle 10. Thus, in some embodiments, the controllable switching devices 30 may include one or more mechanical switches 52 and/or one or more direct current-to-direct current (DC/DC) converters 54, such as one or more boost converters, one or more buck converters, and/or one or more bi-directional converters (e.g., boost-buck converters).

Additionally, in some embodiments, the control unit 32 may control operation based at least in part on operational parameters of the battery system 12, such as temperature, state of charge, output voltage, bus voltage, output current, bus current, and the like. To facilitate determining the operational parameters, the control unit 32 may receive measurements from one or more sensors 29 in the battery system 12. In some embodiments, the sensors 29 may directly measure the operational parameters. Thus, in such embodiments, the sensors 29 may include one or more temperature sensors to measure state of charge, one or more temperature sensors to measure temperature, and/or one or more power sensors to measure electrical power of the first battery 26, the second battery 28, and/or a bus 25. Additionally or alternatively, the control unit 32 may determine the operational parameters based at least in part on the measurements from the sensors 29.

To facilitate controlling operation, the control unit 32 may include memory 56 and one or more processors 58. Specifically, a processor 58 may execute instruction stored in the memory 56 to perform operations in the battery system 12, such as instructing a controllable switching device 30 to open or close. As such, the one or more processors 58 may include one or more general purpose microprocessors, one or more application specific integrated circuits (ASICs), one or more field programmable gate arrays (FPGAs), or any combination thereof. Additionally, the memory 56 may include one or more tangible, non-transitory, computer-readable mediums that store instructions executable by and data to be processed by a processor 58. Thus, in some embodiments, the memory 56 may include random access memory (RAM), read only memory (ROM), rewritable non-volatile memory such as flash memory, hard drives, optical discs, and the like.

As described above, the battery system 12 may be electrically connected to electrical components of the vehicle 10. However, architecture (e.g., configuration of electrical connections) of the battery system 12 may vary between different implementations. Various architectures may enable the battery system 12 to divide operations between the first battery 26 and the second battery 28. However, control scheme implemented by the control unit 32 may vary based at least in part on architecture of the battery system 12.

For example, in some embodiments, the first battery 26 and the second battery 28 may be connected in various parallel architectures, such as a switch-passive parallel architecture or an active parallel architecture. In a switch-passive parallel architecture, the battery system 12 may include multiple batteries may be connected in parallel with one or more being selectively connected and disconnected by a mechanical switch 52. Additionally, in an active parallel architecture, the battery system 12 may include multiple batteries connect in parallel with one or more being selectively connected and disconnected by a DC/DC converter 54.

Figure 8:
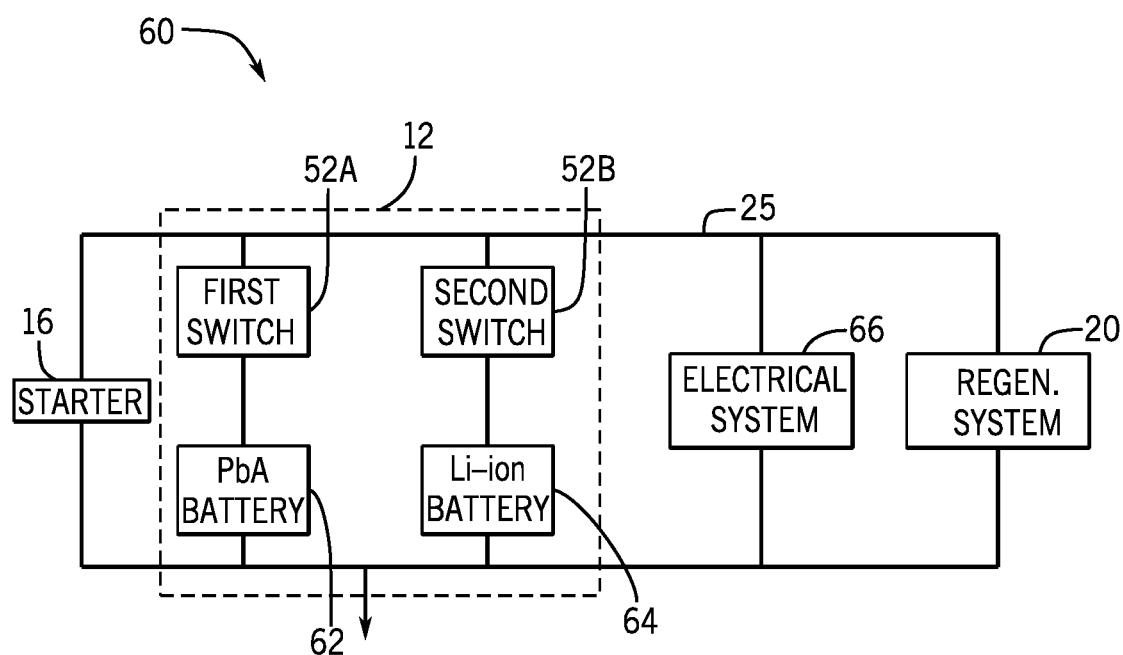
FIG. 8 is a schematic diagram of the battery system of FIG. 1 in a switch-passive parallel battery architecture, in accordance with an embodiment.

To help illustrate, one embodiment of a switch-passive parallel architecture 60 is described in FIG. 8. To simplify discussion, the first battery 26 will be described as a lead-acid (PbA) battery 62 and the second battery 28 will be described as a lithium-ion (Li-ion) battery 64. However, one of ordinary skill in the art should be able to adapt the switch-passive parallel architecture 60 to other pairs of battery chemistries.

In the depicted embodiment, the lead-acid battery 62 and the lithium-ion battery 64 are coupled in parallel with the starter 16, the regenerative braking system 20, and an electrical system 66 via a bus 25. As described above, the electrical system 66 is intended to describe other electrical components in the vehicle 10, such as the HVAC system 24 and/or the vehicle console 22. As depicted, a first mechanical switch 52A is electrically coupled between the lead-acid battery 62 and the bus 25. Additionally a second mechanical switch 52B is electrically coupled between the lithium-ion battery 64 and the bus 25. As such, the control unit 32 may instruct the first mechanical switch 52A to selectively connect and disconnect the lead-acid battery 62 and the second mechanical switch 52B to selectively connect and disconnect the lithium-ion battery 64.

In some embodiments, the control unit 32 may instruct the first mechanical switch 52A and the second mechanical switch 52B to selectively connect and disconnect the lead-acid battery 62 and the lithium ion battery 64 respectively to facilitate dividing operations between the lead-acid battery 62 and the lithium ion battery 64. For example, the control unit 32 may instruct the first mechanical switch 52A to close and the second mechanical switch 52B to open when cold cranking the internal combustion engine 18. In this manner, the lead-acid battery 62 may be used to cold crank the internal combustion engine 18 by itself. As described above, the lead-acid battery 62 may be better suited to cold crank the internal combustion engine 18 due to its ability to operate at lower temperatures and being less affected by deep discharging.

Additionally, the control unit 32 may instruct the first mechanical switch 52A to open and the second mechanical switch 52B to close during braking. In this manner, the lithium-ion battery 64 may be used to capture and store electrical energy generated by the regenerative braking system 20 by itself. As described above, the lithium-ion battery 64 may be better suited to capture electrical energy generated during regenerative braking due to its higher coulombic efficiency and/or higher charge power acceptance. In this manner, the switch-passive parallel battery architecture 60 may enable the control unit 32 to divide operations performed by the battery system 12 between the lead-acid battery 62 and lithium-ion battery 64 based on their respective strengths, which may facilitate improving operational efficiency of the battery system.

In addition to the parallel architectures, the first battery 26 and the second battery 28 may be connected in other architectures that facilitate dividing operations performed by the battery system 12 between the first battery 26 and the second battery 28. For example, in some embodiments, the first battery 26 and the second battery 28 may be connected in various partial parallel architectures, such as a semi-active partial parallel architecture. As used herein, a "partial parallel architecture" is intended to describe an architecture in which the first battery 26 and the second battery 28 and each coupled in parallel with electrical components, but not one another.

Figure 9:
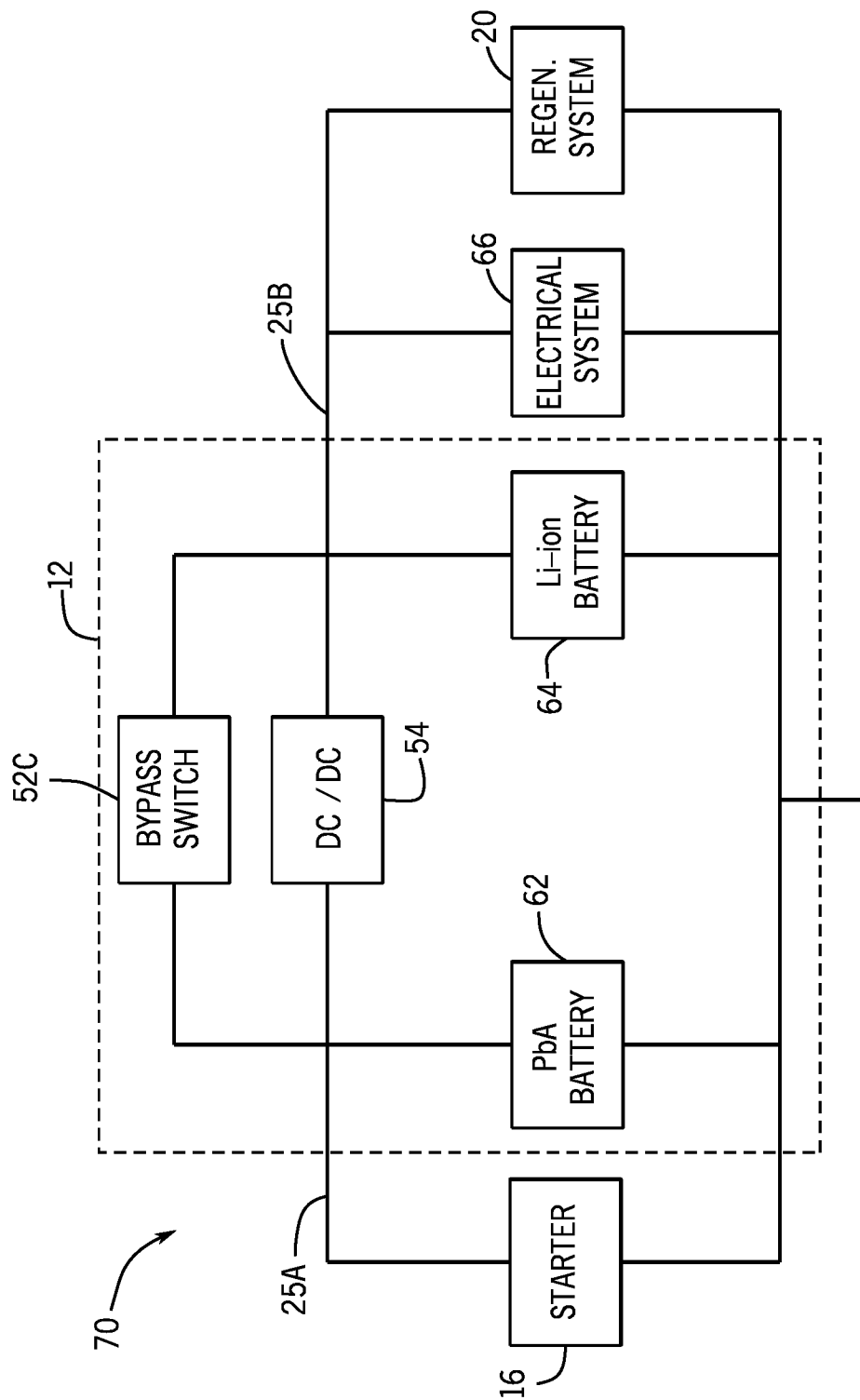
FIG. 9 is a schematic diagram of the battery system of FIG. 1 in a semi-active partial parallel battery architecture, in accordance with an embodiment.

To help illustrate, one embodiment of a semi-active partial parallel architecture 70 is depicted in FIG. 9. To simplify discussion, the first battery 26 will be described as a lead-acid (PbA) battery 62 and the second battery 28 will be described as a lithium-ion (Li-ion) battery 64. However, one of ordinary skill in the art should be able to adapt the semi-active partial parallel architecture 70 to other pairs of battery chemistries.

As depicted, the lead-acid battery 62 is coupled in parallel with the starter 16 via a first bus 25A. Additionally, the lithium-ion battery 64 is coupled in parallel with the regenerative braking system 20 and the electrical system 66 via a second bus 25B. Furthermore, a DC/DC converter 54 and, in some embodiments, a bypass mechanical switch 52C are electrically coupled between the first bus 25A and the second bus 25B.

Generally, the DC/DC converter 54 may function similarly to a mechanical switch 52 by turning on and off to selectively connect and disconnect. In some embodiments, a DC/DC converter 54 may turn off and, thus, disconnect by outputting zero current. For example, the DC/DC converter 54 may maintain an internal switch in a closed position when in a boost configuration or maintain an internal switch in an open position when in a buck configuration. Additionally, a DC/DC converter 54 may turn on and, thus, connect by outputting current with a stepped up or stepped down voltage. For example, the DC/DC converter 54 may maintain the internal switch when in a boost configuration or a buck configuration. In this manner, the control unit 32 uses the DC/DC converter 54 to selectively connect and disconnect the first bus 25A and the second bus 25B and, thus, the lead-acid battery 62 and the lithium-ion battery 64.

As such, the control unit 32 may use the DC/DC converter 54 to facilitate dividing operations between the lead-acid battery 62 and the lithium ion battery 64. For example, the control unit 32 may instruct the DC/DC converter 54 to disconnect the first bus 25A and the second bus 25B when cold cranking the internal combustion engine 18. In this manner, the lead-acid battery 62 may be used to cold crank the internal combustion engine 18 by itself. Additionally, the control unit 32 may instruct the DC/DC converter 54 to disconnect the first bus 25A and the second bus 25B when the vehicle 10 is braking. In this manner, the lithium-ion battery 64 may be used to capture and store electrical energy generated during regenerative braking by itself.

Furthermore, the control unit 32 may instruct the DC/DC converter 54 to connect the first bus 25A and the second bus 25B during normal operation (e.g., when the vehicle is in motion and not braking). In this manner, the lithium-ion battery 64 may supply electrical power to charge the lead-acid battery in addition to powering the electrical system 66. Thus, similar to the switch-passive parallel battery architecture 60, the semi-active partial parallel architecture 70 may enable the control unit 32 to divide operations performed by the battery system 12 between the lead-acid battery 62 and lithium-ion battery 64 based at least in part on their respective strengths.

Although multiple architectures may be suitable to divide operation performed by the battery system between the first battery 26 and the second battery 28, some may present tradeoffs. For example, mechanical switches 52 are generally smaller, less costly, and more robust (e.g., capable of conducting more current) compared to a DC/DC converter 54. As such, the switch-passive parallel architecture 60 may be smaller, less costly, and more robust compared to the semi-active partial parallel architecture 70.

On the other hand, a DC/DC converter 54 may provide greater amounts of control over operation of the battery system 12 compared to a mechanical switch 52. For example, the DC/DC converter 54 may control magnitude of output current. Thus, in some embodiments, the DC/DC converter may control current flowing from the second battery 28 to the first battery 26 and, thus, charging rate of the first battery 26. In fact, in some embodiments, the current may be controlled based at least in part on charge acceptance rate limit of the first battery 26 to improve charging efficiency (e.g., amount of electrical energy expended compared to amount of electrical energy captured). As such, the semi-active partial parallel architecture 70 may enable the control unit 32 to implement control schemes that further improve operational efficiency compared to the switch-passive parallel architecture 60.

Figure 10:
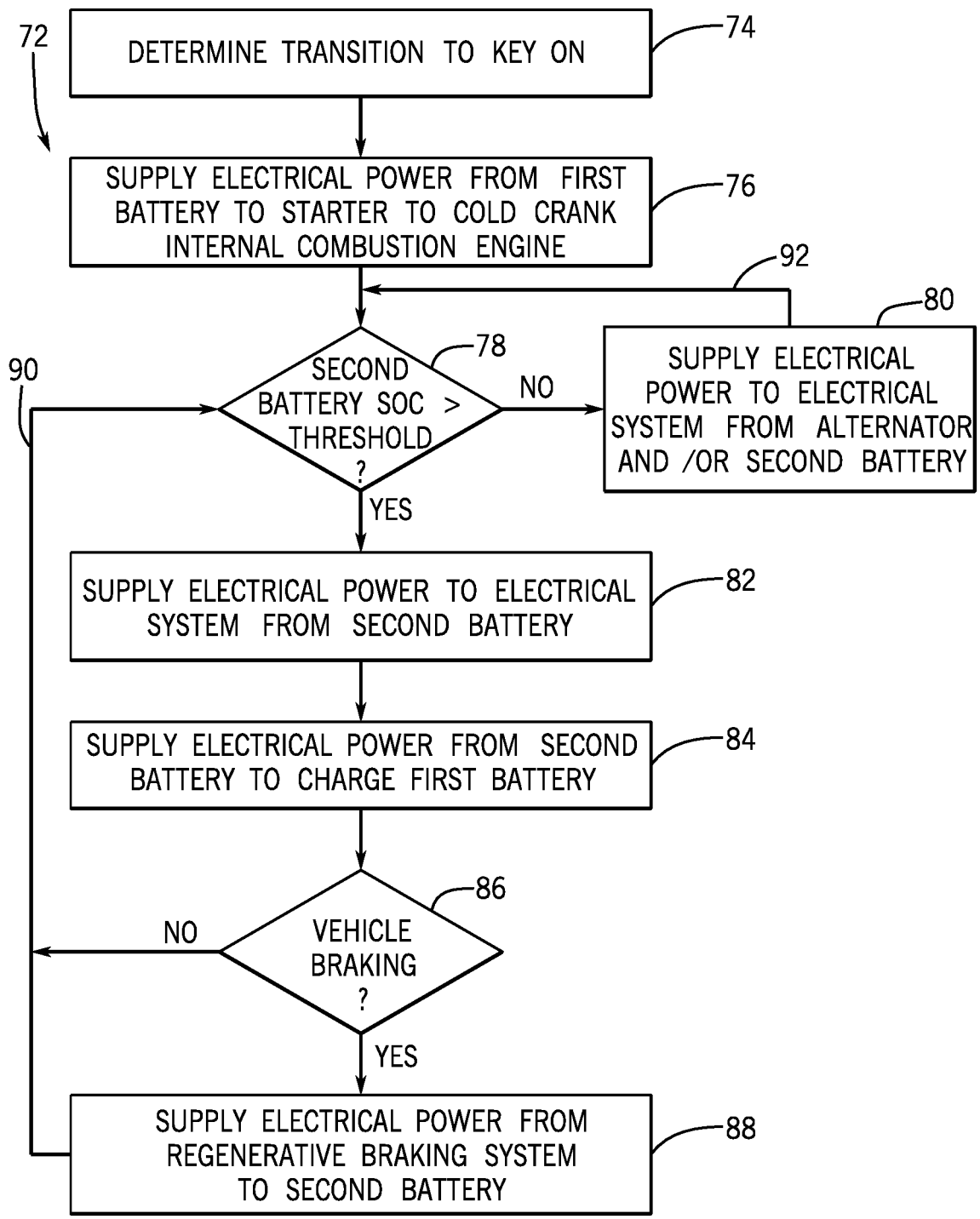
FIG. 10 is a flow diagram of a process for supplying electrical power from the battery system of FIG. 1 when transitioned to key on, in accordance with an embodiment.

One embodiment of a process 72 for controlling operation of the battery system 12 when a vehicle 10 is transitioned from key off to key on is described in FIG. 10. Generally process 72 includes determining when a vehicle transitions to key on (process block 74), supplying electrical power from a first battery to a starter to cold crank an internal combustion engine (process block 76), determining whether state of charge of a second battery is greater than a threshold (decision block 78), and supplying electrical power to the electrical system from an alternator and/or the second battery when the state of charge of the second battery is not greater than the threshold (process block 80). Additionally, when the state of charge of the second battery is greater than the threshold, the process 72 includes supplying electrical power to the electrical system from the second battery (process block 82), supplying electrical power from the second battery to charge the first battery (process block 84), determining whether the vehicle is braking (decision block 86), and supplying electrical power from a regenerative braking system to the second battery when the vehicle is braking (process block 88). In some embodiments, the process 72 may be implemented by executing instructions stored in a tangible, non-transitory, computer-readable medium, such as memory 56, using processing circuitry, such as the processor 58.

Accordingly, in some embodiments, the control unit 32 may determine when a vehicle 10 transitions from key off to key on (process block 74). In some embodiments, the control unit 32 may remain powered on even when the vehicle is key off to control supply of electrical power to key off loads, such as the alarm system. In such embodiments, the control unit 32 may determine when the transition occurs based on an indication, for example, from a central control unit or directly from an ignition. In other embodiment, the control unit 32 may be powered off when the vehicle is key off. In such embodiments, the control unit 32 may determine when the transition occurs based on when electrical power is supplied to turn on the control unit 32.

The control unit 32 may then instruct the battery system 12 to supply electrical power from the first battery 26 to the starter 16 to cold crank the internal combustion engine 18 (process block 76). When key off, temperature of the battery system 12 may gradually adjust to temperature of its surrounding environment, which is generally lower than temperature when the vehicle 10 is key on. In other words, to cold crank the internal combustion engine 18, a battery may be asked to supply electrical power while at a lower temperature compared to other key on loads. Additionally, cranking the internal combustion engine 18 may consume a significant amount of electrical energy. In other words, to crank the internal combustion engine 18, a battery may be drastically discharged.

As described above, battery chemistries may be may exhibit different operational characteristics. For example, lithium-ion batteries 64 may be designed to operate in a smaller and/or higher operating temperature range and in a smaller and/or higher state of charge range. On the other hand, lead-acid batteries 62 may be desired to operate in a larger and/or lower operating temperature range and in a larger and/or lower state of charge range. In other words, a lead-acid battery 62 may be more capable of operating at lower operating temperatures and less affected by deep discharging. As such, the first battery 26 may be a lead-acid battery 62.

In some embodiments, the control unit 32 may instruct the first battery 26 to cold crank the internal combustion engine 18 by instructing the battery system 12 to disconnect the second battery 28 from the starter 16. For example, with regard to the semi-active partial parallel architecture 70 described in FIG. 9, the control unit 32 may instruct the DC/DC converter 54 to turn off, thereby disconnecting the lithium-ion battery 64 from the starter 16 and enabling the lead-acid battery 62 to supply electrical power to the starter 16 by itself. In this manner, operational efficiency of the battery system 12 may be improved since the lead-acid battery 62 is better suited to cold crank the internal combustion engine 18.

Returning to the process 72 described in FIG. 10, the control unit 32 may then determine whether the state of charge of the second battery 28 is greater than an operating range threshold (decision block 78). In some embodiments, the control unit 32 may determine state of charge of the second battery 28 using a state of charge sensor 29. Additionally or alternatively, the control unit 32 may determine state of charge of the second battery 28 based on operational parameters of the second battery 28, such as open circuit voltage.

The control unit 32 may then determine the operating range threshold and compare it with the state of charge of the second battery 28. In some embodiments, the operating range threshold may be predetermined, for example, by a manufacturer, and stored in memory 56. Thus, in such embodiments, the control unit 32 may retrieve the operating range threshold from memory 56. Additionally, in some embodiments, the operating range threshold may be set so that the second battery 28 is maintained within a desired state of charge range (e.g., not deep discharged). Furthermore, in some embodiments, the operating range threshold may be set so that the second battery 28 is sufficient to power the electrical system 66 when above the operating range threshold.

Thus, when the state of charge of the second battery 28 is not greater than the operating range threshold, the control unit 32 may instruct the battery system 12 to supply electrical power to the electrical system 66 from the second battery 28 and/or the alternator (process block 80). More specifically, the alternator may convert mechanical energy output by the internal combustion engine 18 into electrical energy. Thus, in some embodiments, the control unit 32 may instruct the battery system 12 to disconnect the second battery 28 and supply electrical power to the electrical system 66 using only the alternator.

In other embodiments, the control unit 32 may instruct the battery system 12 to charge the second battery 28 using electrical power output from the alternator. In such embodiments, this may result in micro-cycling the second battery 28. For example, the control unit 32 may instruct the alternator to enable and charge the second battery 28 above the operating range threshold. Once above the operating range threshold (e.g., by a set amount), the control unit 32 may instruct the alternator to disable and the second battery 28 to supply electrical power to the electrical system 66. If the second battery 28 again reaches the operating range threshold, the control unit 32 may instruct the alternator to enable and again charge the second battery. Thus, in such embodiments, the control unit 32 may periodically check whether the state of charge of the second battery 28 is above the operating range threshold (arrow 92).

On the other hand, when the state of charge of the second battery 28 is greater that the operating range threshold, the control unit 32 may instruct the battery system 12 to supply electrical power to the electrical system 66 from the second battery 28 (process block 82). As described above, the operating range threshold may be set so that the second battery 28 is sufficient to power the electrical system 66 when above the operating range threshold. Thus, in some embodiments, when above the operating range threshold, the control unit 32 may instruct the battery system 12 to supply electrical power only from the second battery 28. In such embodiments, the alternator may be disabled, thereby reducing load on the internal combustion engine 18 and, thus, improving fuel economy.

Additionally, when the state of charge of the second battery 28 is greater than the operating range threshold, the control unit 32 may instruct the battery system 12 to supply electrical power from the second battery 28 to charge the first battery 26 (process block 84). In some embodiments, the battery system 12 may charge the first battery 26 by enabling current for flow from the second battery 28 to the first battery 26. For example, with regard to the semi-active partial parallel architecture 70 described in FIG. 9, the control unit 32 may instruct the DC/DC converter 54 to produce a current flow from the lithium-ion battery 64 to the lead-acid battery 62.

As described above, in some embodiments, the DC/DC converter 54 may be boost converter, a buck converter, or a bi-directional converter. Thus, in such embodiments, the DC/DC converter 54 may adjust voltage of electrical power output by the lithium-ion battery 64. Thus, the control unit 32 may instruct the DC/DC converter 54 to output a voltage greater than the open-circuit voltage of the lead-acid battery 62. In this manner, the DC/DC converter 54 may enable current to flow from the lithium-ion battery 64, through the second bus 25B, through the first bus 25A, and into the lead-acid battery 62. However, due to the higher voltage, the DC/DC converter 54 may block current from flowing from the first bus 25A to the second bus 25B.

In addition to merely enabling current to flow, the control unit 32 may use the DC/DC converter 54 to control magnitude of the current and, thus, charging rate of the lead-acid battery 62. Specifically, the DC/DC converter 54 may adjust the current output to the lead-acid battery 62 by adjusting its output voltage. For example, as output voltage increases, the output current may decrease and vice versa.

In some embodiments, the control unit 32 may control current supplied to the lead-acid battery 62 based at least in part on the charge acceptance rate limit of the lead-acid battery 62. A charge acceptance rate limit may indicate a limit on amount of electrical energy a battery can capture and store at one time. Thus, additional electrical energy above the charge acceptance rate limit may not be captured and stored in the battery and, in fact, may cause an undesired temperature increase, polarization, and/or an overcharge condition. As such, the DC/DC converter 54 may control the current supplied to improve charging efficiency (e.g., amount of charge used charge) of the lead-acid battery 62 and/or to reduce possibility of undesired effects. In fact, since the charge acceptance rate limit may be low, the DC/DC converter 54 may restrict the lead-acid battery 62 to trickle (e.g., gradual) charging, for example, at less than a maximum charging rate.

Additionally, in some embodiments, the control unit 32 may dynamically control current supplied to the lead-acid battery 62 based at least in part on power consumption by the electrical system 66. More specifically, the lithium-ion battery 64 may output a finite amount of current at one time. As such, the current may be split between consumption by the electrical system 66 and charging of the lead-acid battery 62. Accordingly, when consumption by the electrical system 66 increases, the control unit 32 may instruct the DC/DC converter 54 to divert more electrical power to the electrical system 66 at the expense of charging the lead-acid battery 62. On the other hand, when consumption by the electrical system 66 decreases, the control unit 32 may instruct the DC/DC converter 54 to divert electrical power back to charging the lead-acid battery 62. In this manner, the DC/DC converter 54 may enable the lead-acid battery 62 to be charged without substantially affecting operation of the electrical system 66.

Returning to the process 72 described in FIG. 10, the control unit 32 may also periodically determine whether the vehicle 10 is braking (decision block 86). In some embodiments, the control unit 32 may receive an indication of whether the vehicle 10 is braking, for example, from a central control unit and/or the brakes. In other embodiments, the control unit 32 may determine whether the vehicle 10 is braking based on operational characteristics of the vehicle, such as speed of the vehicle 10 and/or revelations per minute (RPM) of the internal combustion engine 18. For example, the control unit 32 may determine that the vehicle 10 is braking when speed of the vehicle drastically decreases.

When the vehicle 10 is not braking, the control unit 32 may return to determining whether state of charge of the second battery 28 is less than the operating range threshold (arrow 90). On the other hand, when the vehicle 10 is braking, the control unit 32 may instruct the regenerative braking system 20 to supply electrical power to the second battery 28 (process block 88). As described above, the regenerative braking system 20 may converter mechanical (e.g., kinetic) energy of the vehicle 10 into electrical energy, which may be output as electrical power. Thus, supplying the electrical power to the second battery 28 may enable the second battery 28 to capture and store electrical energy generated during regenerative braking for subsequent use in the vehicle 10.

As described above, capturing electrical energy generated during regenerative braking may enable disabling the alternator for periods of time, which facilitates improving fuel economy of the vehicle 10. Thus, such benefits may be improved by increasing amount of electrical energy that is actually captured and stored by the battery system 12. Generally, braking is intended to quickly reduce speed and, thus, mechanical energy of the vehicle 10 over a short time. As such, the electrical power output from the regenerative braking system 20 may be high and last a short period of time. In other words, the battery system 12 may improve benefits of the regenerative braking system 20 by using a battery chemistry for the second battery 28 that increases amount of electrical energy it is able to capture at one time.

As described above, some battery chemistries may be may exhibit different operational characteristics. For example, lead-acid battery chemistries may have a lower coulombic efficiency and/or lower charge acceptance rate limit, which may limit amount of electrical energy captured at one time. On the other hand, lithium-ion battery chemistries may have a higher coulombic efficiency and/or a higher charge acceptance rate limit. In other words, lithium ion battery chemistries may be more capable of capturing a large amount of electrical energy over a short period of time. As such, the second battery 28 may be a lithium-ion battery 64.

In some embodiments, the control unit 32 may instruct the second battery 28 to capture and store the electrical energy generated by the regenerative braking system 20 by instructing the battery system 12 to disconnect the first battery 26 from the regenerative braking system 20. For example, with regard to the semi-active partial parallel architecture 70 described in FIG. 9, the control unit 32 may instruct the DC/DC converter 54 to turn off, thereby disconnecting the lead-acid battery 62 from the regenerative braking system 20 and enabling the lithium-ion battery 64 to capture electrical energy generated during regenerative braking by itself. In this manner, operational efficiency of the battery system 12 may be improved since the lithium-ion battery 64 is better suited to capture electrical energy generated during regenerative braking.

As described above, in some embodiments, the vehicle 10 may be a micro-hybrid vehicle. In such embodiments, the vehicle 10 may disable the internal combustion engine 18 when the vehicle is idle (e.g., stopped) and key on. Subsequently, the battery system 12 may supply electrical power to the starter 16 to warm crank the internal combustion engine 18 when propulsion is desired.

Since a vehicle 10 is generally transitioned to the key off when expected to be idle for extended periods of time, it can be assumed that the internal combustion engine 18 has been in operation relatively recently (e.g., second or minutes) when warm cranked. Accordingly, temperature of the battery system 12 and, specifically, the second battery 28 is generally when the internal combustion engine 18 is warm cranked compared to when the internal combustion engine 18 is cold cranked. Thus, in some embodiments, the second battery 28 may be used in addition to or in alternative to the first battery 26 when warm cranking the internal combustion engine 18.

In other words, in some embodiments, the battery system 12 may use the first battery 26, the second battery 28, or both to warm crank the internal combustion engine 18. In fact, in some embodiments, the control unit 32 may dynamically adjust combination of the first battery 26 and the second battery 28 used to warm crank the internal combustion engine 18 based at least in part on operational parameters of the second battery 28 and/or the first battery 26. For example, the control unit 32 may determine whether to use the second battery 28 based at least in part on temperature of the second battery 28. Specifically, the control unit 32 may instruct the second battery 28 to supply electrical power to warm crank when temperature of the second battery 28 is within a desired operating range. Additionally or alternatively, the control unit 32 may determine whether to use the second battery 28 based at least in part on state of charge of the first battery 26 and/or the state of charge of the second battery 28.

Figure 11:
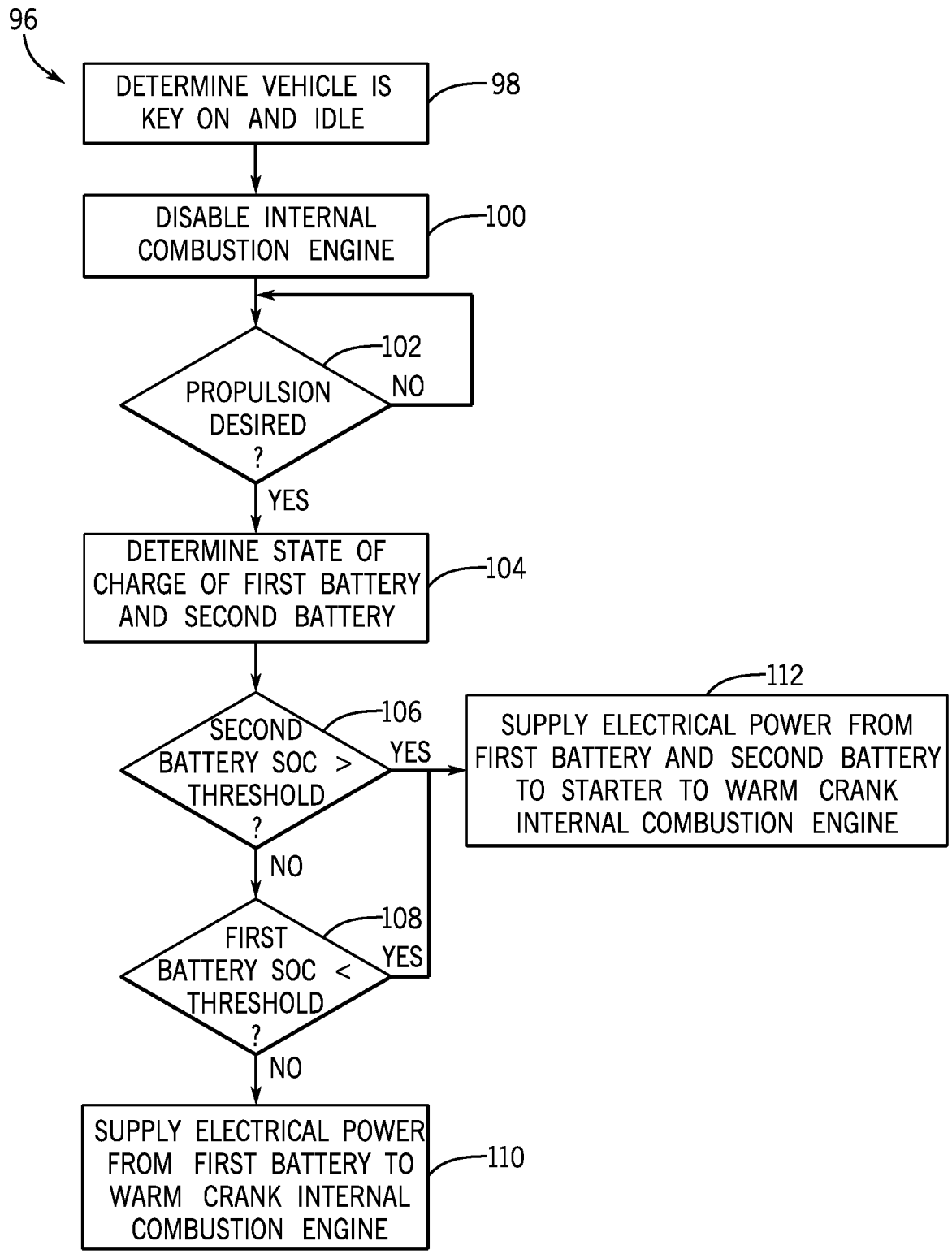
FIG. 11 is a flow diagram of a process for supplying electrical power from the battery system of FIG. 1 to warm crank an internal combustion engine, in accordance with an embodiment.

To help illustrate, one embodiment of a process 96 for dynamically adjusting batteries used to warm crank an internal combustion engine 18 is described in FIG. 11. Generally, the process 96 includes determining that a vehicle is key on and idle (process block 98), disabling an internal combustion engine (process block 100), and determining whether propulsion is desired (decision block 102). Additionally, when propulsion is desired, the process 96 includes determining state of the charge of a first battery and a second battery (process block 104), determining whether state of charge of the second battery is greater than a first threshold (decision block 106), and determining whether state of charge of the first battery is greater than a second threshold (decision block 108). Additionally, the process 96 includes supplying electrical power from the second battery to the starter to warm crank the internal combustion engine when state of the charge of the first battery is not less than the second threshold (process block 110) and supplying electrical power from the first battery and the second battery to the starter to warm crank the internal combustion engine when the state of charge of the second battery is greater than the first threshold or the state of charge of the second battery is less than the second threshold (process block 112). In some embodiments, the process 96 may be implemented by executing instructions stored in a tangible, non-transitory, computer-readable medium, such as memory 56, using processing circuitry, such as the processor 58.

Accordingly, in some embodiments, the control unit 32 may the control unit 32 may determine the vehicle 10 is key on and idle (process block 98). In some embodiments, the control unit 32 may receive an indication of whether the vehicle 10 is key on and idle, for example, from a central control unit and/or the speedometer. In other embodiments, the control unit 32 may determine whether the vehicle 10 is key on and idle based on operational characteristics of the vehicle, such as speed of the vehicle 10 and/or revelations per minute (RPM) of the internal combustion engine 18. For example, the control unit 32 may determine that the vehicle 10 is key on and idle when speed of the vehicle 10 is zero while RPM of the internal combustion engine 18 is non-zero.

When the vehicle 10 is key on and idle, the control unit 32 may instruct the internal combustion engine 18 to disable (process block 98). Disabling the internal combustion engine 18 may reduce fuel consumption and, thus, improve fuel economy of the vehicle 10. While the internal combustion engine 18 is disabled, the second battery 28 may continue supplying electrical power to the electrical system 66.

Additionally, the control unit 32 may periodically determine whether propulsion is desired. In some embodiments, the control unit 32 may receive an indication of whether the propulsion is desired, for example, from a central control unit. In such embodiments, the control unit 32 may receive an indication that propulsion is desired when gas pedal of the vehicle 10 is depressed, brake pedal of the vehicle 10 is released, and/or the vehicle 10 is shifted into drive.

As described above, the control unit 32 may determine whether to use the first battery 26, the second battery 28, or both to warm crank the internal combustion engine based at least in part on operational parameters of the first battery 26 and/or the second battery 28. Thus, in some embodiments, the control unit 32 may determine state of charge of the first battery 26 and state of charge of the second battery 28 (process block 104). In some embodiments, the control unit 32 may determine state of charge of the first battery 26 and/or the second battery 28 using one or more state of charge sensors. Additionally or alternatively, the control unit 32 may determine state of charge of the first battery 26 and/or the second battery 28 based on respective operational parameters, such as open circuit voltage.

The control unit 32 may then determine whether state of charge of the second battery 28 is greater than a first warm crank threshold (decision block 106). In some embodiments, the first warm crank threshold may be predetermined, for example, by a manufacturer and stored in memory 56. Thus, in such embodiments, the control unit 32 may retrieve the first warm crank threshold from memory 56. Additionally, in some embodiments, the first warm crank threshold may be set such that state of charge of the second battery 28 is expected to remain above the operating range threshold even if the second battery 28 is used to warm crank the internal combustion engine 18 by itself.

Thus, in some embodiments, the control unit 32 may instruct the second battery 28 to supply electrical power to the starter 16 by itself to warm crank the internal combustion engine 18 when state of charge of the second battery is greater than the first warm crank threshold. For example, with regard to the semi-active partial parallel architecture 70 described in FIG. 9, the control unit 32 may instruct the DC/DC converter 54 to output a voltage greater than the open-circuit voltage of the lead-acid battery 62. As such, current may flow from the lithium-ion battery 64, through the second bus 25B, through the first bus 25A, and into the lead-acid battery 62 and/or the starter 16. However, in such embodiments, the current capacity and, thus, size and cost of the DC/DC converter 54 may be increased to enable sufficient current to flow from the lithium-ion battery 64 to crank the internal combustion engine 18.

Accordingly, in other embodiments such as the process 96 described in FIG. 11, the control unit 32 may instruct the first battery 26 and the second battery 28 to supply electrical power to the starter to warm crank the internal combustion engine 18 even when state of charge of the second battery is greater than the first warm crank threshold (process block 112). For example, with regard to the semi-active partial parallel architecture 70 described in FIG. 9, the control unit 32 may instruct the DC/DC converter 54 to output a voltage less than the open-circuit voltage of the lead-acid battery 62. In this manner, current may from the current may flow from the lithium-ion battery 64, through the second bus 25B, through the first bus 25A, and into the starter 16. Additionally, the DC/DC converter 54 may block current from flowing from the first bus 25A to the second bus 25B so that current may flow from the lead-acid battery 62, through the first bus 25A, and into the starter 16.

Additionally, the control unit 32 may determine whether state of charge of the first battery 26 is greater than a second warm crank threshold (decision block 108). In some embodiments, the second warm crank threshold may be predetermined, for example, by a manufacturer and stored in memory 56. Thus, in such embodiments, the control unit 32 may retrieve the second warm crank threshold from memory 56. Additionally, in some embodiments, the second warm crank threshold may be set such that the first battery 26 contains sufficient charge to warm crank the internal combustion engine 18 by itself when not less than the second warm crank threshold.

Thus, when state of charge of the first battery 26 is less than the second warm crank threshold, the control unit 32 may instruct the first battery 26 and the second battery 28 to supply electrical power to the starter 16 to warm crank the internal combustion engine 18 (process block 112). On the other hand, when the state of charge of the first battery 26 is not less than the second warm crank threshold, the control unit 32 may instruct the first battery 26 to supply electrical power to the starter 16 to warm crank the internal combustion engine (process block 110).

In some embodiments, similar to cold cranking, the control unit 32 may instruct the first battery 26 to warm cranking the internal combustion engine 18 by instructing the battery system 12 to disconnect the second battery 28 from the starter 16. For example, with regard to the semi-active partial parallel architecture 70 described in FIG. 9, the control unit 32 may instruct the DC/DC converter 54 to turn off, thereby disconnecting the lithium-ion battery 64 from the starter 16 and enabling the lead-acid battery 62 to supply electrical power to the starter 16 by itself.

Based on the above described examples, the battery system 12 may utilize the first battery 26 to crank (e.g., cold crank and/or warm crank) the internal combustion engine and the second battery 28 to support the electrical system 66 when the vehicle 10 is key on. In other words, in such embodiments, the operations performed by the first battery 26 may be reduced. As such, in some embodiments, this may facilitate reducing storage capacity and, thus, physical size of the first battery 26. However, particularly with reduced storage capacity, the first battery 26 should still remain sufficiently charged to cold crank the internal combustion engine 18 when desired. To facilitate, the second battery 28 may charge the first battery 26 when the vehicle 10 is key off.

Figure 12:
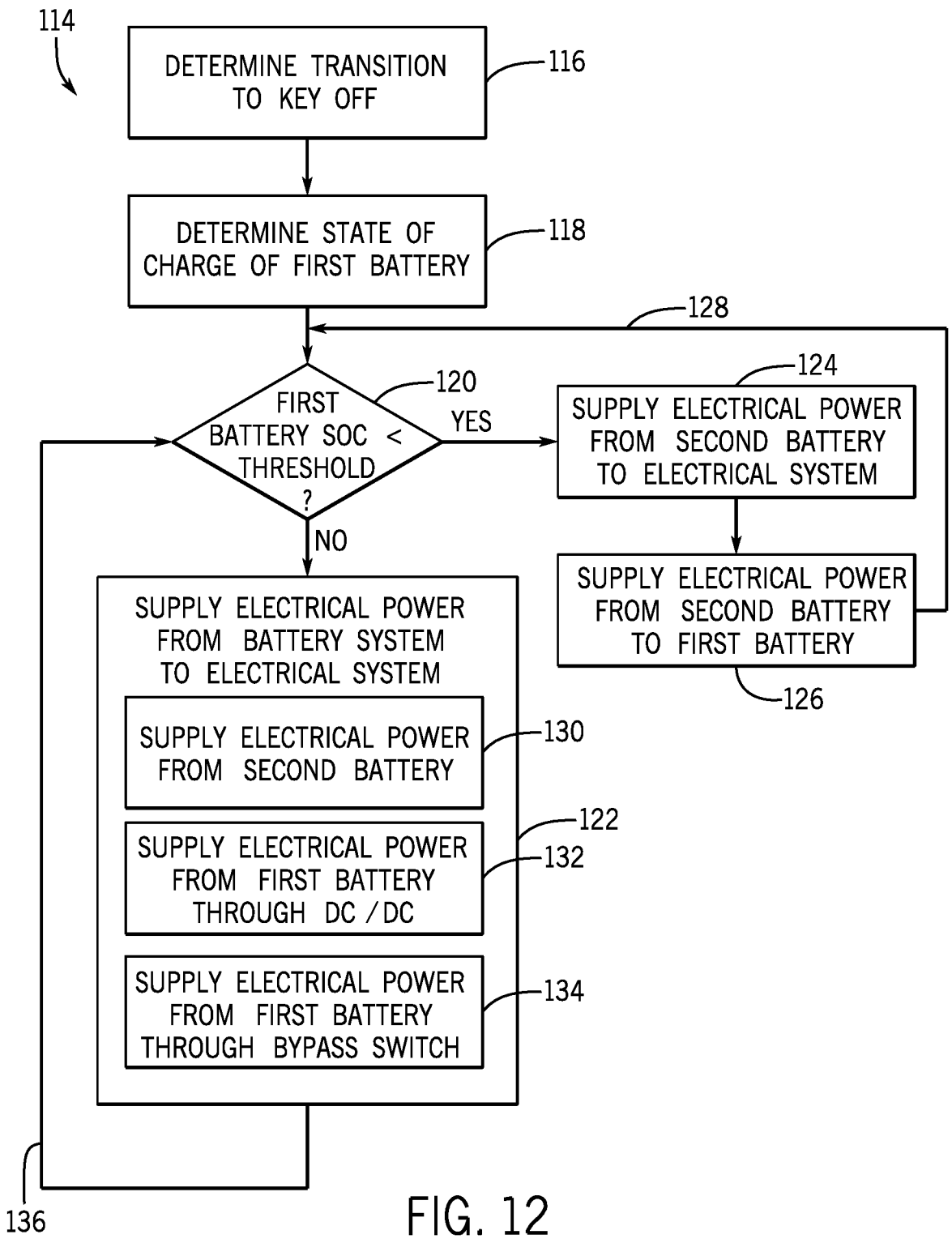
FIG. 12 is a flow diagram of a process for supplying electrical power from the battery system of FIG. 1 when transited to key off, in accordance with an embodiment.

To help illustrate, one embodiment of a process 114 for operating the battery system 12 when the vehicle 10 is transitioned to key off is described in FIG. 12. Generally, the process 114 includes determining that a vehicle transitions to key off (process block 116), determining state of charge of a first battery (process block 118), determining whether state of charge of the first battery is less than a threshold (decision block 120), and supplying electrical power from a battery system to an electrical system when state of charge of the first battery is not less than the threshold (process block 122). Additionally, when state of charge of the first battery is less than the threshold, the process 114 includes supplying electrical power from a second battery to the electrical system (process block 124) and supplying electrical power from the second battery to the first battery (process block 126). In some embodiments, the process 114 may be implemented by executing instructions stored in a tangible, non-transitory, computer-readable medium, such as memory 56, using processing circuitry, such as the processor 58.

Accordingly, in some embodiments, the control unit 32 may determine when a vehicle 10 transitions from key on to key off (process block 116). As described above, in some embodiments, the control unit 32 may remain powered on even when the vehicle is key off to control distribution of electrical power, for example, to key off loads, such as the alarm system. In such embodiments, the control unit 32 may determine when the transition occurs based on an indication, for example, from a central control unit or directly from the ignition.

Additionally, the control unit 32 may determine state of charge of the first battery (process block 118). In some embodiments, the control unit 32 may determine state of charge of the first battery 26 using one or more state of charge sensors 29. Additionally or alternatively, the control unit 32 may determine state of charge of the first battery 26 based operational parameters of the first battery 26, such as open circuit voltage.

The control unit 32 may then determine whether state of charge of the first battery 26 is greater than a cold crank threshold (decision block 120). In some embodiments, the cold crank threshold may be predetermined, for example, by a manufacturer, and stored in memory 56. Thus, in such embodiments, the control unit 32 may retrieve the second warm crank threshold from memory 56. Additionally, in some embodiments, the cold crank threshold may be set such that the first battery 26 contains sufficient charge to cold crank the internal combustion engine 18 by itself when not less than the cold crank threshold. Thus, in some embodiments, the cold crank threshold may be the same or relatively similar to the second warm crank threshold.

When state of charge of the first battery 26 is less than the cold crank threshold, the control unit 32 may instruct the battery system 12 to supply electrical power to the electrical system 66 from the second battery 28 (process block 124). In some embodiments, the second battery 28 may supply electrical power to the electrical system 66 similar to when the vehicle is key on. In this manner, the second battery 28 may supply electrical power to key off loads.

Additionally, when state of charge of the first battery is less than the cold crank threshold, the control unit 32 may instruct the battery system 12 to supply electrical power to charge the first battery 26 (process block 126). In some embodiments, the second battery 28 may charge the first battery 26 similar to when the vehicle 10 is key on. For example, with regard to the semi-active partial parallel architecture 70 described in FIG. 9, the control unit 32 may instruct the DC/DC converter 54 to produce a current flow from the lithium-ion battery 64 to the lead-acid battery 62. As described above, in some embodiments, the DC/DC converter 54 may control current flow and, thus, charging rate of the lead-acid battery 62, for example, based at least in part on charge acceptance rate of the lead-acid battery 62 and/or power consumption by the electrical system 66.

Returning to the process 114 described in FIG. 12, the control unit 32 may periodically check if state of charge of the first battery 26 is less than the cold crank threshold (arrow 128). When state of charge of the first battery 26 is not less than the cold crank threshold, the control unit 32 may instruct the battery system 12 to supply electrical power to the electrical system 66 (process block 122). In this manner, the battery system 12 may supply electrical power to key off loads.

In some embodiments, the second battery 28 may support the key off loads. As such, the second battery 28 may supply electrical power to the electrical system 66 (process block 130). For example, with regard to the semi-active partial parallel architecture 70 described in FIG. 9, the control unit 32 may instruct the DC/DC converter 54 to turn off, thereby disconnecting the first bus 25A from the second bus 25B and enabling the lithium-ion battery 64 to support the key off load by itself.

Additionally or alternatively, the first battery 26 may support key off loads. In some embodiments, the first battery 26 may supply electrical power to the electrical system 66 via a DC/DC converter 54 (process block 132). For example, with regard to the semi-active partial parallel architecture 70 described in FIG. 9, the control unit 32 may instruct the DC/DC converter 54 to adjust voltage output to the electrical system 66. As such, the DC/DC converter 54 may facilitate using the lead-acid battery 62 to support key off loads even when the electrical system 66 is designed to use different voltage electrical power than output from the lead-acid battery 62. For example, when the electrical system 66 is desired to operate with forty-eight volt electrical power and the lead-acid battery 62 outputs twelve volt electrical power, the DC/DC converter 54 may boost the output voltage to forty-eight volts to facilitate use with the electrical system 66.

In other embodiments, the first battery 26 may supply electrical power to the electrical system 66 via a bypass mechanical switch 52C (process block 134). For example, with regard to the semi-active partial parallel architecture 70 described in FIG. 9, the control unit 32 may instruct the battery system 12 to close the bypass mechanical switch 52C. As such, the bypass mechanical switch 52C may directly connect lead-acid battery 62 to the electrical system 66, thereby bypassing the DC/DC converter 54. Since a DC/DC converter 54 is generally more lossy (e.g., consumes electrical energy) than a mechanical switch 52, closing the bypass mechanical switch 52C may facilitate improving electrical power distribution efficiency from the lead-acid battery 62 to the key off loads. However, the bypass mechanical switch 52C may provide the control unit 32 less control over the distribution of electrical power.

Thus, one or more of the disclosed embodiments, alone or on combination, may provide one or more technical effects including improving operational efficiency of a battery system in a vehicle context. For example, the battery system may include multiple batteries with varying battery configurations. In some embodiments, the battery system may utilize a first battery and a second battery with differing battery chemistries and, thus, different operating strengths. For example, the first battery may be a lead-acid battery and the second battery may be lithium-ion battery. To utilize the strengths of the different battery chemistries, the battery system may be operated to divide operations between the first battery and the second battery. For example, the lead-acid battery may be dedicated to cold cranking an internal combustion engine due to its ability to operate at lower temperatures and being less affected by deep discharging. Additionally, the lithium-ion battery may be dedicated to capturing electrical energy generated during regenerative braking due to its higher coulombic efficiency and/or charge acceptance rate limit. In this the operations performed by the battery system may be divided between the multiple batteries based at least in part on their strengths, which may facilitate improving operational efficiency of the battery system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery system comprising:
a first battery electrically coupled to a first bus, wherein the first battery is configured to output first electrical power to the first bus to enable a starter electrically coupled to the first bus to crank an internal combustion engine;
a second battery electrically coupled to a second bus, wherein the second battery is configured to:
store electrical energy generated by a regenerative braking system; and output second electrical power to the second bus using the electrical energy stored in the second battery to enable the battery system to power operation of an electrical component coupled to the second bus; and a DC/DC converter electrically coupled between the first bus and the second bus, wherein the DC/DC converter is configured to control division of the second electrical power output from the second battery into a first portion supplied to charge the first battery via the first bus and a second portion supplied to operate the electrical component via the second bus.

2. The battery system of claim 1, wherein:
the first battery comprises one or more lead-acid battery cells; and the
second battery comprises one or more lithium-ion battery cells.

3. The battery system of claim 1, wherein the battery system is configured to:
supply the first electrical power output from the first battery to the starter to crank the internal combustion engine when an automotive vehicle transitions from key-off to key-on; and supply third electrical power to the starter to crank the internal combustion engine while the automotive vehicle is key-on to transition the automotive vehicle out of an idle state, wherein:
the first battery is configured to supply a first portion of the third electrical power and the second battery is configured to supply a second portion of the third electrical power when a state of charge of the second battery is greater than a first threshold or a state of charge of the first battery is less than a second threshold; and
the first battery is configured to supply the third electrical power by itself when the state of charge of the first battery is not less than the second threshold.

4. The battery system of claim 1, wherein, to control division of the second electrical power, the DC/DC converter is configured to control current flow from the second bus to the first bus based at least in part on charge acceptance rate limit of the first battery, power consumption by the electrical component, or both.

5. The battery system of claim 1, wherein the second battery comprises one or more lithium nickel manganese cobalt oxide battery cells, one or more lithium-titanate/lithium nickel manganese cobalt oxide battery cells, one or more lithium-titanate/lithium manganese oxide battery cells, one or more lithium iron phosphate battery cells, or any combination thereof.

6. The battery system of claim 1, comprising:
a first positive terminal configured to electrically couple the first battery to the first bus;
a second positive terminal configured to electrically coupled the second battery to the second bus; and
a negative terminal configured to electrically couple the first battery and the second battery to ground.

7. A battery module comprising:
a first battery comprising one or more lead-acid battery cells;
a first positive terminal coupled to the first battery, wherein the first positive terminal is configured to electrically couple the first battery to a first bus to enable the first battery to output at least a portion of first electrical power used to crank an internal combustion engine;
a second battery comprising one or more lithium-ion battery cells; a second positive terminal coupled to the second battery, wherein the second positive terminal is configured to electrically couple the second battery to a second bus to enable the second battery to capture electrical energy generated by a regenerative braking system and to output second electrical power used to power operation of an electrical system; and a negative terminal coupled to the first battery and the second battery, wherein the negative terminal is configured to electrically couple the first battery and the second battery to ground.

8. The battery module of claim 7, comprising a switching device electrically coupled between the first battery and the second battery, wherein the switching device is configured to control current flow between the first bus and the second bus.

9. The battery module of claim 8, wherein the switching device comprises a DC/DC converter configured to control division of the second electrical power output from the second battery into:
a first portion of the second electrical power supplied to the electrical system via the second bus; and
a second portion of the second electrical power supplied to the first bus to charge the first battery.

10. The battery module of claim 8, comprising a housing, wherein: the first
battery, the second battery, and the switching device are disposed within the housing; and
the first positive terminal, the second positive terminal, and the negative terminal extend through the housing.

11. The battery module of claim 7, wherein the battery module only includes three terminals.

12. The battery module of claim 7, wherein:
the one or more lead-acid battery cells are configured to produce a first open circuit voltage within a first voltage range across the first battery; and
the one or more lithium-ion battery cells are configured to produce a second open circuit voltage within a second voltage range that is greater than the first voltage range across the second battery.

13. The battery module of claim 7, wherein: the first battery comprises a twelve volt battery;
the first positive terminal comprises a positive twelve volt terminal;
the second battery comprises a forty-eight volt battery; and
the second positive terminal comprises a positive forty-eight volt terminal.

14. The battery module of claim 7, wherein:
the first battery comprise a first voltage class battery configured to produce a first voltage within a first voltage range; and
the second battery comprises a second voltage class battery configured to produce a second voltage within a second voltage range that is greater than the first voltage range.

15. The battery module of claim 7, wherein:
the first positive terminal is associated with a first voltage range; and the second positive terminal is associated with a second voltage range that is greater than and non-overlapping with the first voltage range.

16. The battery module of claim 7, wherein:
the first battery is configured to supply the first electrical power used by a starter to crank the internal combustion engine by itself when an automotive vehicle transitions from key-off to key-on; and
to transition the automotive vehicle out of an idle state while key-on:
the first battery is configured to supply a first portion of the first electrical power and the second battery is configured to supply a second portion of the first electrical power used by the starter to crank the internal combustion engine when a state of charge of the second battery is greater than a first threshold or a state of charge of the first battery is less than a second threshold; and
the first battery is configured to supply the first electrical power used by the starter to crank the internal combustion engine by itself when the state of charge of the first battery is not less than the second threshold.

* * * * *